US011467284B2

(12) United States Patent
Yamamoto et al.

(10) Patent No.: US 11,467,284 B2
(45) Date of Patent: Oct. 11, 2022

(54) SENSOR SYSTEM, SENSOR MODULE, AND LAMP DEVICE

(71) Applicant: KOITO MANUFACTURING CO., LTD., Tokyo (JP)

(72) Inventors: Teruaki Yamamoto, Shizuoka (JP); Yusuke Kasaba, Shizuoka (JP); Takashi Hori, Shizuoka (JP); Yoshiaki Fushimi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 290 days.

(21) Appl. No.: 16/332,469

(22) PCT Filed: Sep. 8, 2017

(86) PCT No.: PCT/JP2017/032430
§ 371 (c)(1),
(2) Date: Mar. 12, 2019

(87) PCT Pub. No.: WO2018/051906
PCT Pub. Date: Mar. 22, 2018

(65) Prior Publication Data
US 2020/0301012 A1    Sep. 24, 2020

(30) Foreign Application Priority Data

Sep. 15, 2016  (JP) .............................. JP2016-180576
Sep. 15, 2016  (JP) .............................. JP2016-180580

(51) Int. Cl.
*G01S 17/86*    (2020.01)
*G01S 15/86*    (2020.01)
(Continued)

(52) U.S. Cl.
CPC ............ *G01S 17/86* (2020.01); *B60Q 1/0023* (2013.01); *G01S 7/521* (2013.01); *G01S 15/86* (2020.01); *G01S 17/08* (2013.01); *G01S 17/931* (2020.01)

(58) Field of Classification Search
CPC .................................................. B60Q 1/0023
See application file for complete search history.

(56) References Cited

U.S. PATENT DOCUMENTS

| 4,418,464 A | 12/1983 | DiGiacomo |
| 5,313,213 A | 5/1994 | Neumann et al. |

(Continued)

FOREIGN PATENT DOCUMENTS

| CN | 1402181 A | 3/2003 |
| CN | 2687616 Y | 3/2005 |

(Continued)

OTHER PUBLICATIONS

International Search Report (PCT/ISA/210) dated Nov. 14, 2017 issued by the International Searching Authority in International Application No. PCT/JP2017/032430.

(Continued)

*Primary Examiner* — Hovhannes Baghdasaryan
(74) *Attorney, Agent, or Firm* — Sughrue Mion, PLLC

(57) ABSTRACT

A LiDAR sensor (41) is configured to sense information of an outside of a vehicle. An ultrasonic sensor (42) is configured to sense information of the outside of the vehicle in a different manner from the LiDAR sensor (41). A first bracket (43) supports the LiDAR sensor (41) and the ultrasonic sensor (42). A first sensor actuator (44) is configured to adjust a sensing reference position of the LiDAR sensor (41) relative to the first bracket (43). A second sensor actuator (45) is configured to adjust a sensing reference position of the ultrasonic sensor (42) relative to first bracket (43). A first (Continued)

bracket actuator (46) is configured to adjust at least one of a position and a posture of the first bracket (43) relative to the vehicle.

10 Claims, 8 Drawing Sheets

(51) Int. Cl.
*G01S 17/931* (2020.01)
*B60Q 1/00* (2006.01)
*G01S 7/521* (2006.01)
*G01S 17/08* (2006.01)

(56) References Cited

U.S. PATENT DOCUMENTS

| | | | |
|---|---|---|---|
| 5,562,336 A | | 10/1996 | Gotou |
| 6,578,993 B2* | | 6/2003 | Kobayashi ............... B60Q 1/12 315/79 |
| 6,828,928 B2* | | 12/2004 | Dubrovin ............... G01S 17/931 342/70 |
| 2007/0242944 A1 | | 10/2007 | Mizusawa |
| 2008/0055114 A1 | | 3/2008 | Kim et al. |
| 2009/0219191 A1* | | 9/2009 | Natsume ............... B60Q 1/0023 342/109 |
| 2009/0295181 A1* | | 12/2009 | Lawlor ............... B60R 1/12 296/1.11 |
| 2011/0317439 A1 | | 12/2011 | Yamazaki et al. |
| 2012/0081544 A1 | | 4/2012 | Wee |
| 2014/0247349 A1* | | 9/2014 | Heard ............... H04N 7/18 348/148 |
| 2014/0249740 A1 | | 9/2014 | Niemz |
| 2014/0303827 A1 | | 10/2014 | Dolgov et al. |
| 2014/0354798 A1 | | 12/2014 | Galarraga |
| 2014/0358328 A1 | | 12/2014 | Fassbender |
| 2015/0323148 A1* | | 11/2015 | Tsuda ............... F21K 9/64 362/510 |
| 2016/0144770 A1* | | 5/2016 | Graf ............... G01S 17/931 362/464 |
| 2019/0011544 A1* | | 1/2019 | Gassend ............... G01S 13/931 |

FOREIGN PATENT DOCUMENTS

| | | |
|---|---|---|
| CN | 101015200 A | 8/2007 |
| CN | 101101333 A | 1/2008 |
| CN | 102328616 A | 1/2012 |
| CN | 102419160 A | 4/2012 |
| CN | 102447911 A | 5/2012 |
| CN | 103732481 A | 4/2014 |
| CN | 103889795 A | 6/2014 |
| CN | 105072320 A | 11/2015 |
| DE | 102009060392 A1 | 6/2011 |
| DE | 102014111098 A1 | 2/2016 |
| DE | 102015007172 A1 | 2/2016 |
| EP | 2626243 A1 | 8/2013 |
| JP | H05-321069 A | 12/1993 |
| JP | H08-062016 A | 3/1996 |
| JP | H08-192673 A | 7/1996 |
| JP | 9-323590 A | 12/1997 |
| JP | 2001-158284 A | 6/2001 |
| JP | 2001-197337 A | 7/2001 |
| JP | 2004-341441 A | 12/2004 |
| JP | 2006232486 A | 9/2006 |
| JP | 2010-185769 A | 8/2010 |
| JP | 2011-151225 A | 8/2011 |
| JP | 2013-164913 A | 8/2013 |
| JP | 2016-522769 A | 8/2016 |
| WO | 2006/035510 A1 | 4/2006 |

OTHER PUBLICATIONS

Written Opinion (PCT/ISA/237) dated Nov. 14, 2017 issued by the International Searching Authority in International Application No. PCT/JP2017/032430.
Communication dated May 7, 2020, from the State Intellectual Property Office of People's Republic of China in counterpart Application No. 201780056724.X.
Communication dated May 4, 2020, from the European Patent Office in counterpart European Application No. 17850808.1.
Office Action dated Mar. 4, 2021, issued by the State Intellectual Property Office of P.R. China in counterpart Chinese Patent Application No. 201780056724.X.
Communication dated Jul. 13, 2021 issued by the Japanese Intellectual Property Office in counterpart Japanese Application No. 2018-539675.

* cited by examiner

FIG. 8
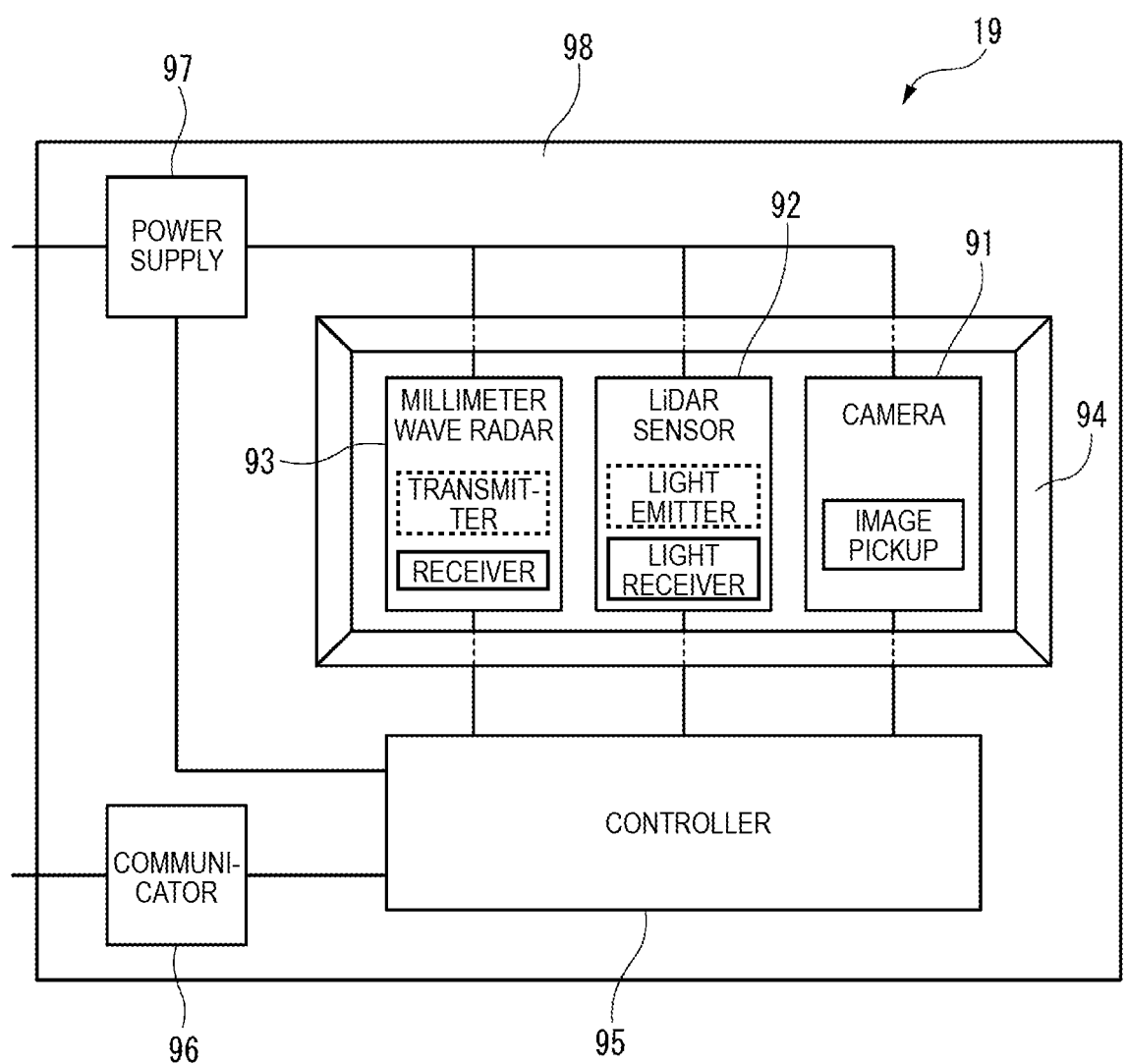
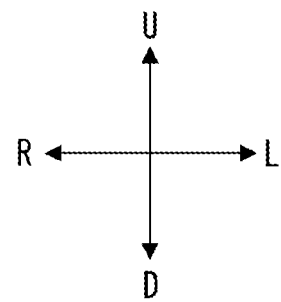

SENSOR SYSTEM, SENSOR MODULE, AND LAMP DEVICE

TECHNICAL FIELD

The presently disclosed subject matter relates to a sensor system to be mounted on a vehicle.

The presently disclosed subject matter also relates to a sensor module mounted on a vehicle, and a lamp device including the sensor module.

BACKGROUND ART

In order to realize a self-driving technique of a vehicle, sensors for obtaining external information of the vehicle shall be mounted on a vehicle body. Different types of sensors may be used to more accurately obtain the external information. As such sensors, a camera and a LiDAR (Light Detection and Ranging) sensor can be exemplified (see Patent Document 1, for example).

Patent Documents 2 and 3 disclose a configuration in which a camera is disposed in a lamp chamber of a head lamp. The head lamp lights an area ahead of the vehicle. The camera captures an image of an area ahead of the vehicle. If the light emitted from the head lamp enters the field of view of the camera, a desired image may not be obtained. Therefore, in the configurations described in Patent Documents 2 and 3, a shielding member is provided so as to surround the camera. As a result, the amount of light emitted from the head lamp and entering the field of view of the camera can be reduced.

PRIOR ART DOCUMENT

Patent Document

Patent Document 1: Japanese Patent Publication No. 2010-185769A

Patent Document 2: Japanese Patent Publication No. 2011-197337A

Patent Document 3: Japanese Patent Publication No. 2013-164913A

SUMMARY

Technical Problem

With the advancement of driving support technology, it is required to obtain more diverse information from the outside of the vehicle. Therefore, the number of types of sensors as described above tends to increase.

When the sensor as described above is mounted on a vehicle body, it is necessary to adjust the posture of the sensor with respect to the vehicle body or the sensing reference position of the sensor. As the number of types of sensors increases, the burden of works for the adjustment operation is increased because the number of objects requiring adjustment increases.

Therefore, it is demanded to reduce the burden of works for adjusting the sensing reference positions of plural types of sensors to be mounted on the vehicle (the first demand).

In addition, it is demanded to provide a configuration capable of obtaining more diverse external information of the vehicle (the second demand).

Solution to Problem

In order to meet the first demand described above, an illustrative aspect of the presently disclosed subject matter provides a sensor system adapted to be mounted on a vehicle, comprising:
  a first sensor configured to sense information of an outside of the vehicle;
  a second sensor configured to sense information of the outside of the vehicle in a different manner from the first sensor;
  a supporting member supporting the first sensor and the second sensor;
  a first adjuster configured to adjust a sensing reference position of the first sensor relative to the supporting member;
  a second adjuster configured to adjust a sensing reference position of the second sensor relative to the supporting member;
  a third adjuster configured to adjust at least one of a position and a posture of the supporting member relative to the vehicle.

In a pre-shipment adjustment process of the sensor system, the first adjuster adjusts the sensing reference position of the first sensor with respect to the supporting member, and the second adjuster adjusts the sensing reference position of the second sensor with respect to the supporting member. When the sensor system is mounted on the vehicle, the sensing reference positions of the sensors may deviate from desired positions due to tolerances of vehicle body components or the positional deviation of the sensor system relative to the vehicle body. Accordingly, after the sensor system is mounted on the vehicle, the sensing reference positions of the first sensor and the second sensor are readjusted. In the above configuration, the first sensor and the second sensor are supported by a common supporting member. Accordingly, the third adjuster can collectively adjust the sensing reference positions of the first sensor and the second sensor.

Therefore, even if the number of types of sensors to be mounted on the vehicle increases, it is possible to reduce the burden of works for adjusting the sensing reference positions of the plural types of sensors relative to the vehicle.

The sensor system may be configured so as to further comprise an actuator configured to adjust at least one of the position and the posture of the supporting member in accordance with a predetermined signal.

The first sensor and the second sensor are used, for example, to obtain information to be used for the self-driving. Therefore, after the sensor system is mounted on the vehicle, it is not preferable that an ordinary user can easily adjust the sensing reference positions of these sensors.

According to the above configuration, since the adjustment of the sensing reference positions of the first sensor and the second sensor with respect to the vehicle is performed through the signal input to the actuator, the adjustment action by the ordinary user can be limited as compared with the adjustment through the screw mechanism.

Alternatively, the sensor system may be configured to further comprise an identifier holding information adapted to be identified by the vehicle. The sensor system may be configured such that: the third adjuster includes a screw mechanism configured to adjust at least one of the position and the posture of the supporting member; and the identifier is configured to be destroyed when the screw mechanism is operated.

According to such a configuration, when the ordinary user tries to operate the screw mechanism, the identifier is destroyed. This makes it impossible for the vehicle to identify the information held by the identifier. In such a case, since a portion of the function of the vehicle is limited, or an alert is constantly displayed, it is possible to cause the ordinary user to hesitate to execute the adjustment action.

In this case, the sensor system may be configured to further comprise a cover covering at least a portion of the screw mechanism. The sensor system may be configured such that: the identifier is provided on the cover; and the identifier is configured to be destroyed when the cover is removed.

According to such a configuration, after a qualified adjustment is performed by a maintenance personnel or the like, the original condition can be restored by mounting the covers provided with the identifier to the screw mechanism. Therefore, it is possible to reduce the burden of works to be performed by the maintenance personnel or the like.

Additionally or alternatively, the sensor system may be configured such that the third adjuster includes a screw mechanism disposed in such a position that is not visually recognizable or not operable from a front side or an upper side of the vehicle.

According to such a configuration, since it is necessary to operate the screw mechanism from a lower side of the vehicle, it is possible to cause the ordinary user to hesitate to execute the adjustment action.

The sensor system may be configured to further comprise a light source configured to emit light for lighting a predetermined area. The sensor system may be configured such that the light source is supported on the supporting member.

From the viewpoint of efficiently acquiring information around the vehicle and from the viewpoint of design, it is demanded to dispose a sensor for obtaining information of the outside of the vehicle at locations in the vicinity of lighting devices that are disposed at four corners of the vehicle. According to such a configuration, the adjustment of the lighting reference position of the light source can be associated with the adjustment of the sensing reference positions of the first sensor and the second sensor via the supporting member. Thus, the light source can be integrated into the sensor system. That is, it is possible to satisfy the above-mentioned demand.

Moreover, the third adjuster can collectively adjust, relative to the vehicle, the lighting reference position of the light source and the sensing reference positions of the first sensor and the second sensor. Therefore, it is possible to reduce the burden of works for adjusting the lighting reference position of the light source relative to the vehicle.

In this case, the sensor system may be configured so as to comprise a fourth adjuster configured to adjust a lighting reference position of the light source relative to the supporting member.

According to such a configuration, in a so-called preshipment adjustment process, the lighting reference position of the light source with respect to the supporting member can be adjusted independently of the first sensor and the second sensor. That is, the degree of freedom of the reference position adjustment of the lighting system independent of the sensing system can be increased.

The sensor system may be configured such that the first sensor and the second sensor include at least two of a LiDAR sensor, a camera, a millimeter wave radar, and an ultrasonic sensor.

In order to meet the second demand described above, an illustrative aspect of the presently disclosed subject matter provides a sensor module adapted to be mounted on a vehicle, comprising:
  a first sensor configured to sense information of an outside of the vehicle;
  a second sensor configured to sense information of the outside of the vehicle in a different manner from the first sensor; and
  a shielding member surrounding at least a sensing section of the first sensor and at least a sensing section of the second sensor.

In order to meet the second demand described above, an illustrative aspect of the presently disclosed subject matter provides a lamp device adapted to be mounted on a vehicle, comprising:
  a light source;
  a first sensor configured to sense information of an outside of the vehicle;
  a second sensor configured to sense information of the outside of the vehicle in a different manner from the first sensor; and
  a shielding member surrounding at least a sensing section of the first sensor and at least a sensing section of the second sensor, and configured to obstruct a portion of light emitted from the light source.

From the viewpoint of efficiently acquiring information around the vehicle and from the viewpoint of design, it is demanded to dispose a sensor for obtaining information of the outside of the vehicle at interior spaces of the lamp devices that are disposed at four corners of the vehicle. However, there is a possibility that the light emitted from the light source included in the lamp device is directly or indirectly incident on the sensing section of the sensor through internal reflection or the like. In order to suppress the adverse influence of the incident light on the information to be sensed, it is necessary to provide a shielding member for covering the sensing section of the sensor.

On the other hand, in order to obtain more diverse external information of the vehicle, it is necessary to increase the types of sensors to be mounted on the lamp device. From the viewpoint of suppressing the enlargement of the lamp device, it is desirable that a plurality of sensors are arranged close to each other. However, a shielding member provided to suppress the incidence of undesired light on the sensing section of one sensor may obstruct the sensing of information performed by another sensor.

In each of the above-mentioned aspects relating to the second demand, the shielding member of the sensor module is arranged so as to surround at least the sensing section of the first sensor for sensing external information of the vehicle as well as at least the sensing section of the second sensor for sensing external information of the vehicle in a different manner from the first sensor. Thus, the shielding member suppresses direct or indirect incident of the light emitted from the light source such as a lamp device on the sensing section of the first sensor while not obstructing the information sensing performed by the second sensor. Accordingly, it is possible to provide a configuration capable of obtaining more diverse external information of the vehicle while suppressing enlargement of the ramp device.

The above sensor module may be configures so as to further comprise:

a controller communicably connected to a control device mounted on the vehicle and configured to control operations of the first sensor and the second sensor; and a supporting member supporting the first sensor, the second sensor, and the controller.

That is, plural types of sensors differing in sensing manners, a shielding member surrounding the sensing sections of the plural types of sensors, and circuits for operating the plural types of sensors are modularized on the supporting member. Thus, it is possible to provide a configuration that can facilitate mounting work to the lamp device while more diverse external information of the vehicle can be obtained.

In addition, since the controller is shared by the first sensor and the second sensor, it is possible to suppress the enlargement and the cost-increasing of the sensor module.

In this case, the sensor module may be configures such that the controller is configured to process signals outputted from the first sensor and the second sensor.

According to such a configuration, the processing of the information sensed by the first sensor and the second sensor can be at least partially assigned to the controller of the sensor module. As a result, the control load of the controller mounted on the vehicle can be reduced.

Additionally or alternatively, the sensor module may be configured so as to comprise an adjusting mechanism configured to adjust at least one of a position and a posture of the supporting member relative to the vehicle.

When the lamp device or the like is mounted on the vehicle, the sensing reference positions of the sensors may deviate from desired positions due to tolerances of vehicle body components or the positional deviation of the lamp device or the like relative to the vehicle body. Accordingly, after the lamp device or the like is mounted on the vehicle, the sensing reference positions of the first sensor and the second sensor are readjusted. In the above configuration, the first sensor and the second sensor are supported by the supporting member. Therefore, the sensing reference positions of the first sensor and the second sensor can be collectively adjusted through an appropriate adjusting mechanism.

The sensor module may be configured such that: the first sensor is a visible light camera; and the second sensor includes at least one of a LiDAR sensor, a millimeter wave radar, an ultrasonic sensor, and an infrared camera.

BRIEF DESCRIPTION OF THE DRAWINGS

FIG. 8 illustrates a second sensor module of FIG. 6.

DESCRIPTION OF EMBODIMENTS

Figure 1:
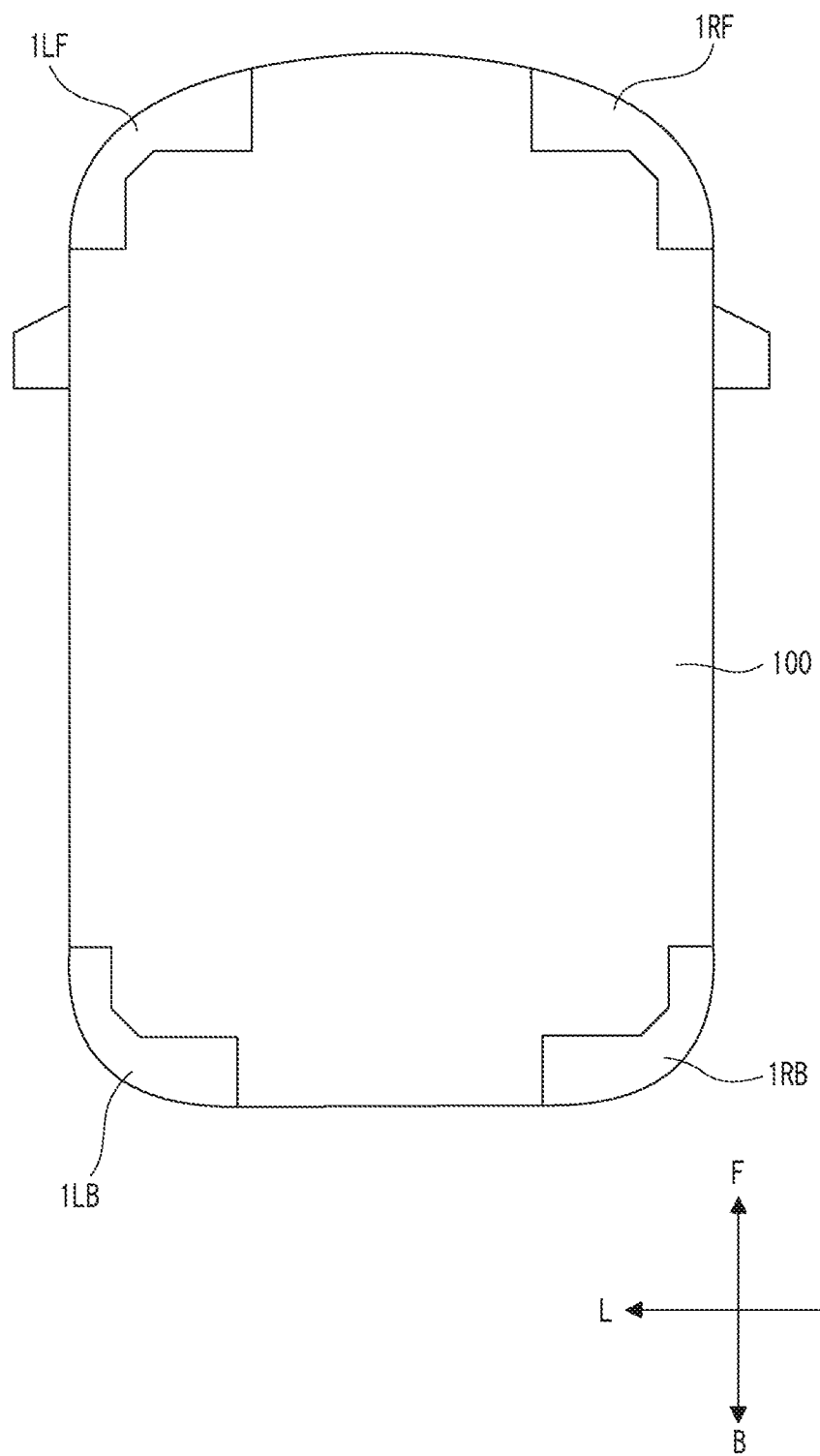
FIG. 1 illustrates a position of a lighting system or a lamp device on a vehicle.

Examples of embodiments will be described below in detail with reference to the accompanying drawings. In each of the drawings used in the following descriptions, the scale is appropriately changed in order to make each of the members have a recognizable size.

In the accompanying drawings, an arrow F represents a forward direction of the illustrated structure. An arrow B represents a rearward direction of the illustrated structure. An arrow L represents a leftward direction of the illustrated structure. An arrow R represents a rightward direction of the illustrated structure. The terms of "left" and "right" used in the following descriptions indicate the left-right directions as viewed from the driver's seat. In the accompanying drawings, the term "up-down direction" corresponds to the direction perpendicular to the drawing sheet.

As illustrated in FIG. 1, a left front sensor system 1LF according to a first embodiment is mounted on a left front corner of a vehicle 100. A right front sensor system 1RF according to the first embodiment is mounted on a right front corner of the vehicle 100.

Figure 2:
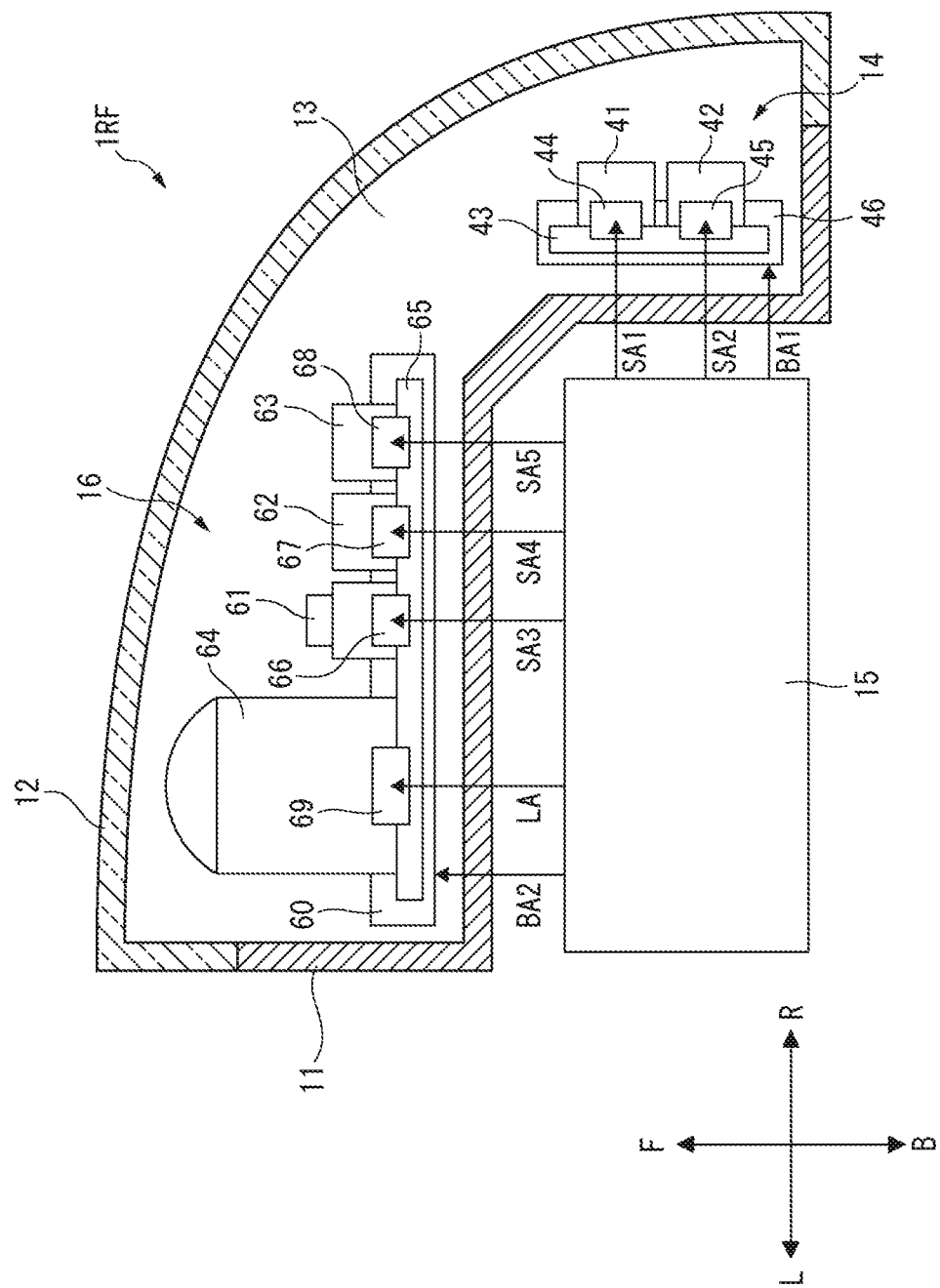
FIG. 2 illustrates a sensor system according to a first embodiment.

FIG. 2 schematically illustrates a configuration of the right front sensor system 1RF. Although not illustrated, the left front sensor system 1LF has a configuration symmetrical with the right front sensor system 1RF relative to the left-right direction.

The right front sensor system 1RF is housed in a lamp chamber 13 defined by a housing 11 and a translucent housing 12.

The right front sensor system 1RF includes a first sensor unit 14. The first sensor unit 14 includes a LiDAR sensor 41, an ultrasonic sensor 42, a first bracket 43, a first sensor actuator 44, a second sensor actuator 45, and a first bracket actuator 46.

The LiDAR sensor 41 (an example of the first sensor) has a configuration for emitting non-visible light and a configuration for sensing returned light as a result of the non-visible light being reflected by an object that is present at least on the right of the vehicle 100 (an example of the outside of the vehicle). As required, the LiDAR sensor 41 may include a scan device that sweeps the non-visible light to change the light emitting direction (i.e., the sensing direction). In the present embodiment, infrared light having a wavelength of 905 nm is used as the non-visible light.

The LiDAR sensor 41 can obtain the distance to the object associated with the returned light, for example, based on the time period from the time when the non-visible light is emitted in a certain direction to the time when the returned light is sensed. Further, by accumulating such distance data in association with the sensing position, it is possible to obtain information as to the shape of the object associated with the returned light. Additionally or alternatively, information as to an attribute such as the material of the object associated with the returned light can be obtained based on the difference in wavelength between the emitted light and the returned light. Additionally or alternatively, information about the color of the object, such as a white line on the road surface, can be obtained, for example, based on the difference in reflectivity of the returned light from the road surface.

That is, the LiDAR sensor 41 is a sensor that senses information of at least on the right of the vehicle 100. The LiDAR sensor 41 outputs a signal corresponding to an attribute (intensity, wavelength or the like) of the sensed returned light. The above-mentioned information is obtained by appropriately processing signal outputted from the LiDAR sensor 41 by an information processor (not illustrated). The information processor may be provided in the right front sensor system 1RF or may be mounted on the vehicle 100.

The ultrasonic sensor 42 (an example of the second sensor) is configured to transmit ultrasonic waves (several tens of kHz to several GHz) and to receive reflected waves as a result of the ultrasonic waves being reflected by an object that is present at least on the right of the vehicle 100 (an example of the outside of the vehicle). As required, the ultrasonic sensor 42 may include a scan device that sweeps the non-visible light to change the transmitting direction (i.e., the sensing direction).

The ultrasonic sensor 42 can obtain the distance to the object associated with the reflected wave, for example, based on the time period from the time when the ultrasonic wave is transmitted in a certain direction to the time when the reflected wave is received. Further, by accumulating such distance data in association with the sensing position, it is possible to obtain information as to the shape of the object associated with the reflected wave.

That is, the ultrasonic sensor 42 is a sensor that senses information of at least on the right of the vehicle 100 in a manner different from that of the LiDAR sensor 41. The ultrasonic sensor 42 outputs a signal corresponding to an attribute (intensity or the like) of the received reflected wave. The above-mentioned information is obtained by appropriately processing a signal outputted from the ultrasonic sensor 42 by an information processor (not illustrated). The information processor may be provided in the right front sensor system 1RF or may be mounted on the vehicle 100.

The first bracket 43 (one example of the supporting member) supports the LiDAR sensor 41 and the ultrasonic sensor 42.

The first sensor actuator 44 (one example of the first adjuster) is a device for adjusting a sensing reference position of the LiDAR sensor 41. At least a portion of the first sensor actuator 44 is disposed in the lamp chamber 13 and is coupled to the LiDAR sensor 41.

The first sensor actuator 44 is configured to change at least one of the position and the posture of the LiDAR sensor 41 with respect to the first bracket 43 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The second sensor actuator 45 (one example of the second adjuster) is a device for adjusting a sensing reference position of the ultrasonic sensor 42. At least a portion of the second sensor actuator 45 is disposed in the lamp chamber 13 and is coupled to the ultrasonic sensor 42.

The second sensor actuator 45 is configured to change at least one of the position and the posture of the ultrasonic sensor 42 with respect to the first bracket 43 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The first bracket actuator 46 (one example of a third adjuster) is a device for adjusting at least one of the position and posture of the first bracket 43 relative to the vehicle 100. At least a portion of the first bracket actuator 46 is disposed in the lamp chamber 13 and coupled to the first bracket 43.

The first bracket actuator 46 is configured to change at least one of the position and the posture of the first bracket 43 relative to the vehicle 100 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The right front sensor system 1RF includes a signal processor 15. The signal processor 15 may be realized as a function of an electronic control unit (ECU) mounted on the vehicle 100, or may be realized as a function of a control device disposed in the lamp chamber 13.

The signal processor 15 is configured to output a drive signal SA1 for driving the first sensor actuator 44. The drive signal SA1 includes information for adjusting at least one of the position and the posture of the first sensor actuator 44 in the horizontal plane, and information for adjusting at least one of the position and the posture of the first sensor actuator 44 in the vertical plane. The respective information may be included in a single signal or may be provided with separate signals.

In a pre-shipment adjusting process of the right front sensor system 1RF, the sensing reference position of the LiDAR sensor 41 is adjusted. In the present embodiment, at least one of the position and the posture of the LiDAR sensor 41 with respect to the first bracket 43 (or the housing 11) is adjusted by inputting an appropriate drive signal SA1 to the first sensor actuator 44.

The signal processor 15 configured to output a drive signal SA2 for driving the second sensor actuator 45. The drive signal SA2 includes information for adjusting at least one of the position and the posture of the second sensor actuator 45 in the horizontal plane, and information for adjusting at least one of the position and the posture of the second sensor actuator 45 in the vertical plane. The respective information may be included in a single signal or may be provided with separate signals.

In the pre-shipment adjusting process of the right front sensor system 1RF, the sensing reference position of the ultrasonic sensor 42 is adjusted. In the present embodiment, at least one of the position and the posture of the ultrasonic sensor 42 with respect to the first bracket 43 (or the housing 11) is adjusted by inputting an appropriate drive signal SA2 to the second sensor actuator 45.

The signal processor 15 is configured to output a drive signal BA1 for driving the first bracket actuator 46. The drive signal BA1 includes information for adjusting at least one of the position and the posture of the first bracket actuator 46 in the horizontal plane, and information for adjusting at least one of the position and the posture of the first bracket actuator 46 in the vertical plane. The respective information may be included in a single signal or may be provided with separate signals.

When the right front sensor system 1RF is mounted on the vehicle 100, the sensing reference positions of the sensors may deviate from desired positions due to tolerances of vehicle body components or the positional deviation of the housing 11 relative to the vehicle body. Accordingly, after the right front sensor system 1RF is mounted on the vehicle 100, the sensing reference positions of the LiDAR sensor 41 and the ultrasonic sensor 42 are readjusted. In the present embodiment, the LiDAR sensor 41 and the ultrasonic sensor 42 are supported by the first bracket 43. Therefore, by inputting an appropriate drive signal BA1 to the first bracket actuator 46, the sensing reference positions of the LiDAR sensor 41 and the ultrasonic sensor 42 can be adjusted collectively.

Therefore, even if the number of types of sensors to be mounted on the vehicle 100 increases, it is possible to reduce the burden of works for adjusting the sensing reference positions of the sensors relative to the vehicle 100.

The LiDAR sensor 41 and the ultrasonic sensor 42 are used, for example, to obtain information to be used for the self-driving. Therefore, after the right front sensor system 1RF is mounted on the vehicle 100, it is not preferable that an ordinary user can easily adjust the sensing reference positions of these sensors.

In the present embodiment, since the adjustment of the sensing reference positions of the LiDAR sensor 41 and the ultrasonic sensor 42 relative to the vehicle 100 is performed by inputting the drive signal BA1 from the signal processor 15 to the first bracket actuator 46, the adjustment action by the ordinary user can be limited as compared with the adjustment through the screw mechanism.

The right front sensor system 1RF includes a second sensor unit 16. The second sensor unit 16 includes a camera 61, a LiDAR sensor 62, a millimeter wave radar 63, a light source 64, a second bracket 65, a third sensor actuator 66, a fourth sensor actuator 67, a fifth sensor actuator 68, a light source actuator 69, and a second bracket actuator 60.

The camera 61 (an example of the first sensor) is a device for capturing an image of at least ahead of the vehicle 100 (an example of the outside of the vehicle). That is, the camera 61 is a sensor that senses information of at least ahead of the vehicle 100. The camera 61 is configured to output a video signal corresponding to the captured image. The information of at least ahead of the vehicle 100 sensed by the camera 61 is obtained by appropriately processing the video signal by an information processor (not illustrated). The information processor may be provided in the right front sensor system 1RF or may be mounted on the vehicle 100.

The LiDAR sensor 62 (an example of the second sensor) is a sensor that senses information of at least ahead of the vehicle 100 (an example of the outside of the vehicle) in a manner different from the camera 61. Since the configuration and the operation principles of the LiDAR sensor 62 are the same as those of the LiDAR sensor 41 of the first sensor unit 14, repetitive descriptions thereof will be omitted.

The millimeter wave radar 63 (an example of the second sensor) has a configuration for transmitting a millimeter wave and a configuration for receiving a reflected wave as a result of the millimeter wave being reflected by an object that is present at least in front of the vehicle 100 (an example of the outside of the vehicle). As required, the millimeter wave radar 63 may include a scan device that sweeps the millimeter wave to change the transmitting direction (i.e., the sensing direction). In the present embodiment, a millimeter wave having a frequency of 76 GHz is used. Examples of other frequencies include 24 GHz, 26 GHz, 79 GHz, etc.

The millimeter wave radar 63 can obtain the distance to the object associated with the reflected wave, for example, based on the time period from the time when the millimeter wave is transmitted in a certain direction to the time when the reflected wave is received. Further, by accumulating such distance data in association with the sensing position, it is possible to obtain information as to the shape of the object associated with the reflected wave.

That is, the millimeter wave radar 63 is a sensor that senses information of at least ahead of the vehicle 100 by a manner different from the camera 61 and the LiDAR sensor 62. The millimeter wave radar 63 outputs a signal corresponding to an attribute (intensity or the like) of the received reflected wave. The above-mentioned information is obtained by appropriately processing a signal outputted from the millimeter wave radar 63 by an information processor (not illustrated). The information processor may be provided in the right front sensor system 1RF or may be mounted on the vehicle 100.

The light source 64 includes an optical system including at least one of a lens and a reflector, and emits light that lights a predetermined region. The light source 64 is disposed in the lamp chamber 13. As the light source 64, a lamp light source or a light emitting element can be used. Examples of a lamp light source include an incandescent lamp, a halogen lamp, a discharge lamp, and a neon lamp. Examples of the light emitting element include a light emitting diode, a laser diode, and an organic EL element.

The second bracket 65 (one example of the supporting member) supports the camera 61, the LiDAR sensor 62, the millimeter wave radar 63, and the light source 64.

The third sensor actuator 66 (one example of the first adjuster) is a device for adjusting a sensing reference position of the camera 61. At least a portion of the third sensor actuator 66 is disposed in the lamp chamber 13 and is coupled to the camera 61.

The third sensor actuator 66 is configured to change at least one of the position and the posture of the camera 61 with respect to the second bracket 65 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The fourth sensor actuator 67 (an example of the second adjuster) is a device for adjusting a sensing reference position of the LiDAR sensor 62. At least a portion of the fourth sensor actuator 67 is disposed in the lamp chamber 13 and is coupled to the LiDAR sensor 62.

The fourth sensor actuator 67 is configured to change at least one of the position and the posture of the LiDAR sensor 62 with respect to the second bracket 65 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The fifth sensor actuator 68 (an example of the second adjuster) is a device for adjusting a sensing reference position of the millimeter wave radar 63. At least a portion of the fifth sensor actuator 68 is disposed in the lamp chamber 13 and coupled to the millimeter wave radar 63.

The fifth sensor actuator 68 is configured to change at least one of the position and the posture of the millimeter wave radar 63 with respect to the second bracket 65 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

A light source actuator 69 (an example of the fourth adjuster) is a device for adjusting a lighting reference position of the light source 64. At least a portion of the light source actuator 69 is disposed in the lamp chamber 13 and is coupled to the light source 64.

The light source actuator 69 is configured to change at least one of the position and the posture of the light source 64 with respect to the second bracket 65 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The second bracket actuator 60 (one example of the third adjuster) is a device for adjusting at least one of the position and posture of the second bracket 65 relative to the vehicle 100. At least a portion of the second bracket actuator 60 is disposed in the lamp chamber 13 and coupled to the second bracket 65.

The second bracket actuator 60 is configured to change at least one of the position and the posture of the second bracket 65 relative to the vehicle 100 in a horizontal plane (in a plane including the front-rear direction and the left-right direction in FIG. 2) and in a vertical plane (in a plane including the left-right direction and the up-down direction in FIG. 2). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The signal processor 15 is configured to output a drive signal SA3 for driving the third sensor actuator 66. The drive signal SA3 includes information for adjusting at least one of the position and the posture of the third sensor actuator 66 in the horizontal plane, and information for adjusting at least one of the position and the posture of the third sensor actuator 66 in the vertical plane. The respective information may be included in a single signal or may be provided with separate signals.

In the pre-shipment adjusting process of the right front sensor system 1RF, the sensing reference position of the camera 61 is adjusted. In the present embodiment, at least one of the position and the posture of the camera 61 with respect to the second bracket 65 (or the housing 11) is adjusted by inputting an appropriate drive signal SA3 to the third sensor actuators 66.

The signal processor 15 is configured to output a drive signal SA4 for driving the fourth sensor actuator 67. The drive signal SA4 includes information for adjusting at least one of the position and the posture of the fourth sensor actuator 67 in the horizontal plane, and information for adjusting at least one of the position and the posture of the fourth sensor actuator 67 in the vertical plane. The respective information may be included in a single signal or may be provided with separate signals.

In the pre-shipment adjusting process of the right front sensor system 1RF, the sensing reference position of the LiDAR sensor 62 is adjusted. In the present embodiment, at least one of the position and the posture of the LiDAR sensor 62 with respect to the second bracket 65 (or the housing 11) is adjusted by inputting an appropriate drive signal SA4 to the fourth sensor actuators 67.

The signal processor 15 is configured to output a drive signal SA5 for driving the fifth sensor actuator 68. The drive signal SA5 includes information for adjusting at least one of the position and the posture of the fifth sensor actuator 68 in the horizontal plane, and information for adjusting at least one of the position and the posture of the fifth sensor actuator 68 in the vertical plane. The respective information may be included in a single signal or may be provided with separate signals.

In the pre-shipment adjusting process of the right front sensor system 1RF, the sensing reference position of the millimeter wave radar 63 is adjusted. In the present embodiment, at least one of the position and the posture of the millimeter wave radar 63 with respect to the second bracket 65 (or the housing 11) is adjusted by inputting an appropriate drive signal SA5 to the fifth sensor actuators 68.

The signal processor 15 is configured to output a drive signal LA for driving the light source actuator 69. The drive signal LA includes information for adjusting at least one of the position and the posture of the light source actuator 69 in the horizontal plane and information for adjusting at least one of the position and the posture of the light source actuator 69 in the vertical plane. The respective information may be included in a single signal or may be provided with separate signals.

In the process of pre-shipment tuning of the right front sensor system 1RF, the lighting reference position of the light source 64 is adjusted. In the present embodiment, at least one of the position and the posture of the light source 64 with respect to the second bracket 65 (or the housing 11) is adjusted by inputting an appropriate drive signal LA to the light source actuator 69.

The signal processor 15 is configured to output a drive signal BA2 for driving the second bracket actuator 60. The drive signal BA2 includes information for adjusting at least one of the position and the posture of the second bracket actuator 60 in the horizontal plane, and information for adjusting at least one of the position and the posture of the second bracket actuator 60 in the vertical plane. The respective information may be included in a single signal or may be provided with separate signals.

When the right front sensor system 1RF is mounted on the vehicle 100, the sensing reference positions of the sensors may deviate from desired positions due to tolerances of vehicle body components or the positional deviation of the housing 11 relative to the vehicle body. Accordingly, after the right front sensor system 1RF is mounted on the vehicle 100, the sensing reference positions of the camera 61, the LiDAR sensor 62, and the millimeter wave radar 63 are readjusted. In the present embodiment, the camera 61, the LiDAR sensor 62, and the millimeter wave radar 63 are supported by the second bracket 65. Therefore, by inputting an appropriate drive signal BA2 to the second bracket actuator 60, the sensing reference positions of the camera 61, the LiDAR sensor 62, and the millimeter wave radar 63 can be collectively adjusted.

Therefore, even if the number of types of sensors to be mounted on the vehicle 100 increases, it is possible to reduce the burden of works for adjusting the sensing reference positions of the sensors relative to the vehicle 100.

The camera 61, the LiDAR sensor 62, and the millimeter wave radar 63 are used, for example, to obtain information to be used for the self-driving. Therefore, after the right front sensor system 1RF is mounted on the vehicle 100, it is not preferable that an ordinary user can easily adjust the sensing reference positions of these sensors.

In the present embodiment, since the adjustment of the sensing reference positions of the camera 61, the LiDAR sensor 62, and the millimeter wave radar 63 relative to the vehicle 100 is performed by inputting the drive signal BA2 from the signal processor 15 to the second bracket actuator 60, the adjustment action by the ordinary user can be limited as compared with the adjustment through the screw mechanism.

In the present embodiment, a light source 64 is supported by second bracket 65 supporting the camera 61, the LiDAR sensor 62, and the millimeter wave radar 63.

From the viewpoint of efficiently acquiring information around the vehicle and from the viewpoint of design, it is demanded to dispose a sensor for obtaining information of the outside of the vehicle at locations in the vicinity of lighting devices that are disposed at four corners of the vehicle. According to such a configuration, the adjustment of the lighting reference position of the light source 64 can be associated with the adjustment of the sensing reference positions of the camera 61, the LiDAR sensor 62, and the millimeter wave radar 63 via the second bracket 65. Thus, the light source 64 can be integrated into the right front sensor system 1RF. That is, it is possible to satisfy the above-mentioned demand.

In addition, by inputting an appropriate drive signal BA2 to the second bracket actuator 60, the lighting reference position of the light source 64 as well as the sensing reference positions of the camera 61, the LiDAR sensor 62, and the millimeter wave radar 63 relative to the vehicle 100 can be adjusted collectively. Therefore, it is possible to reduce the burden of works for adjusting the lighting reference position of the light source 64 relative to the vehicle 100.

In the present embodiment, the light source actuator 69 for adjusting the lighting reference position of the light source 64 is provided. Therefore, in the so-called pre-shipment adjustment process, the lighting reference position of the light source 64 with respect to the second bracket 65 (or the housing 11) can be adjusted independently of the camera 61, the LiDAR sensor 62, and the millimeter wave radar 63. That is, the degree of freedom of the reference position adjustment of the lighting system independent of the sensing system can be increased.

In the first sensor unit 14 according to the present embodiment, the sensing reference position of the LiDAR sensor 41 and the sensing reference position of the ultrasonic sensor 42 are adjusted by the first sensor actuator 44 and the second sensor actuator 45, respectively. However, at least one of the first sensor actuator 44 and the second sensor actuator 45 may be replaced by a known screw mechanism.

In the second sensor unit 16 according to the present embodiment, the sensing reference position of the camera 61, the sensing reference position of the LiDAR sensor 62, and the sensing reference position of the millimeter wave radar 63 are adjusted by the third sensor actuator 66, the fourth sensor actuator 67, and the fifth sensor actuator 68, respectively. However, at least one of the third sensor actuator 66, the fourth sensor actuator 67, and the fifth sensor actuator 68 may be replaced by a known screw mechanism.

In the present embodiment, the first sensor unit 14 includes the LiDAR sensor 41 and the ultrasonic sensor 42, and the second sensor unit 16 includes the camera 61, the LiDAR sensor 62, and the millimeter wave radar 63. However, the sensor units are configured to include at least two of the camera, the LiDAR sensor, the millimeter wave radar, and the ultrasonic sensor in accordance with a target to be sensed, a sensing range, a sensing distance, and the like. The number of each sensor can also be appropriately determined.

In the present embodiment, the first sensor unit 14 and the second sensor unit 16 are housed in a common housing 11. However, the first sensor unit 14 and the second sensor unit 16 may be housed in different housings.

In the present embodiment, the left front sensor system 1LF and the right front sensor system 1RF are exemplified as the sensor system including plural types of sensors. However, the configuration described with reference to the right front sensor system 1RF is also applicable to a left rear sensor system 1LB to be disposed in a left rear corner portion of the vehicle 100 illustrated in FIG. 1 and a right rear sensor system 1RB to be disposed in a right rear corner portion of the vehicle 100 illustrated in FIG. 1. For example, the right rear sensor system 1RB may have a configuration that is symmetrical with the right front sensor system 1RF relative to the front-rear direction. The rear left sensor system 1LB may have a configuration symmetrical with the rear right sensor system 1RB relative to the left-right direction.

Figure 3:
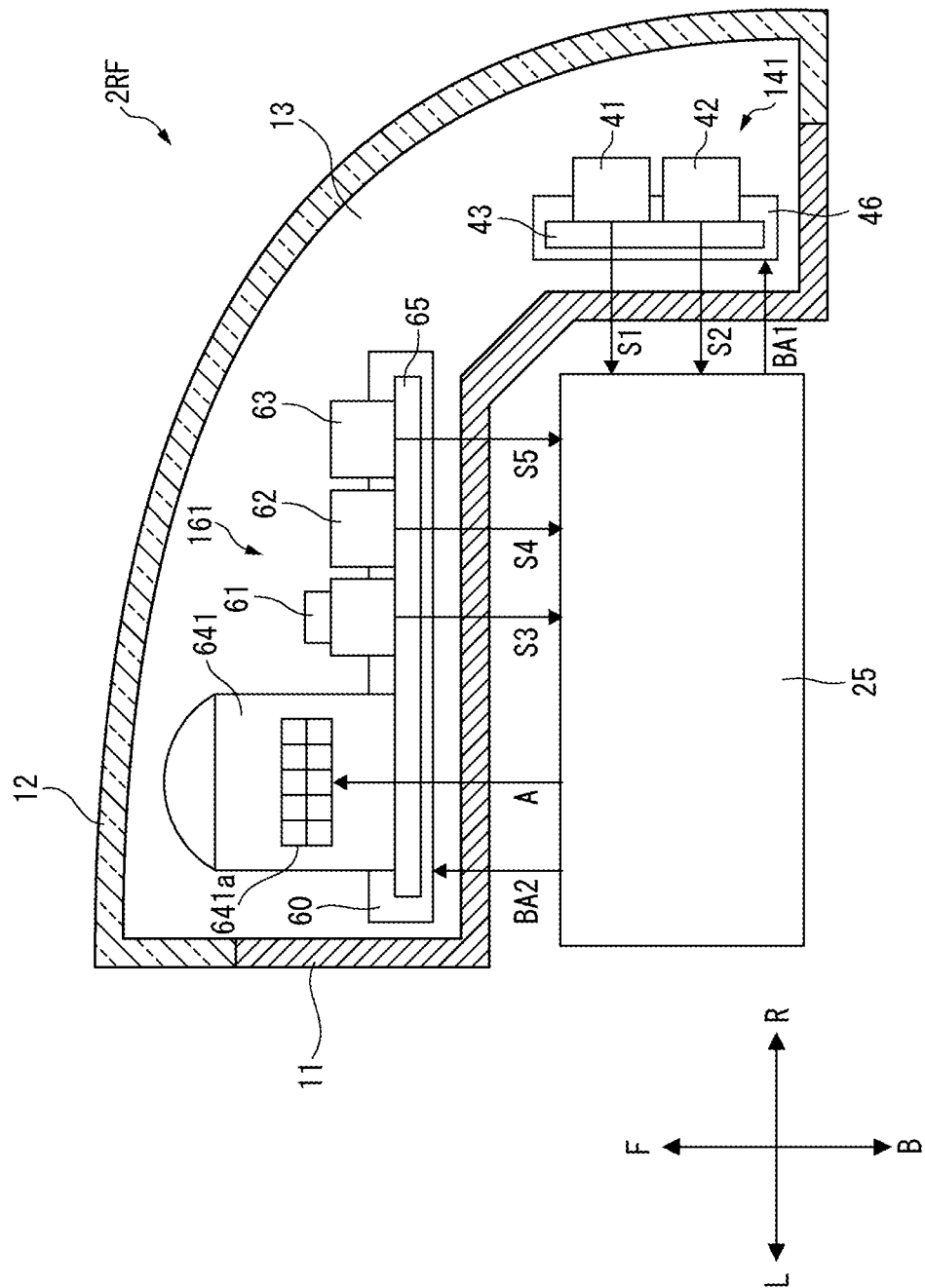
FIG. 3 illustrates a sensor system according to a second embodiment.

FIG. 3 schematically illustrates a configuration of a right front sensor system 2RF according to a second embodiment. Components that are the same as or equivalent to those of the right front sensor system 1RF according to the first embodiment are assigned with the same reference numerals, and repetitive descriptions for those will be omitted.

The right front sensor system 2RF includes a first sensor unit 141. The first sensor unit 141 includes a LiDAR sensor 41, an ultrasonic sensor 42, a first bracket 43, and a first bracket actuator 46.

The right front sensor system 2RF includes a signal processor 25. The signal processor 25 may be realized as a function of an electronic control unit (ECU) mounted on the vehicle 100, or may be realized as a function of a control device disposed in the lamp chamber 13.

The LiDAR sensor 41 outputs a sensing signal S1 corresponding to an attribute (intensity, wavelength or the like) of the sensed returned light. The ultrasonic sensor 42 outputs a sensing signal S2 corresponding to an attribute (intensity or the like) of the received reflected wave. The sensing signal S1 and the sensing signal S2 are inputted to the signal processor 25.

In a pre-shipment adjusting process of the right front sensor system 2RF, a sensing reference position of the LiDAR sensor 41 is adjusted. In the present embodiment, a deviation amount of the sensing reference position of the LiDAR sensor 41 from a predetermined position is first specified by a well-known technique. The signal processor 25 is configured to receive the sensing signal S1 from the LiDAR sensor 41, and to correct the information obtained from the sensing signal S1 based on the specified deviation amount. The correction may be performed on the sensing signal S1 itself, or may be performed on another signal or data corresponding to the sensing signal S1.

In the present embodiment, a mechanism for individually adjusting the posture of the LiDAR sensor 41 are not provided. Accordingly, when a deviation of the sensing reference position of the LiDAR sensor 41 is sensed, the posture of the LiDAR sensor 41 is not changed so as to cancel the deviation, but the information obtained from the LiDAR sensor 41 is corrected. More specifically, the information obtained from the LiDAR sensor 41 is corrected to information that would have been obtained if there was no deviation in the reference position sensed by the LiDAR sensor 41. As a result, there can be obtained substantially the same information as in a case where the posture of the LiDAR sensor 41 is changed so as to cancel the deviation of the sensing reference position. That is, it can be said that the signal processor 25 (one example of the first adjuster) indirectly adjusts the sensing reference position of the LiDAR sensor 41.

In the pre-shipment adjusting process of the right front sensor system 2RF, the sensing reference position of the ultrasonic sensor 42 is adjusted. In the present embodiment, a deviation amount of the sensing reference position of the ultrasonic sensor 42 from a predetermined position is first specified by a well-known technique. The signal processor 25 is configured to receive the sensing signal S2 from the ultrasonic sensor 42, and to correct the information obtained from the sensing signal S2 based on the specified deviation amount. The correction may be performed on the sensing signal S2 itself, or may be performed on another signal or data corresponding to the sensing signal S2.

In the present embodiment, a mechanism for individually adjusting the posture of the ultrasonic sensor 42 is not provided. Accordingly, when a deviation of the sensing reference position of the ultrasonic sensor 42 is sensed, the posture of the ultrasonic sensor 42 is not changed so as to cancel the deviation, but the information obtained from the ultrasonic sensor 42 is corrected. More specifically, the information obtained from the ultrasonic sensor 42 is corrected to information that would have been obtained if there was no deviation in the reference position sensed by the ultrasonic sensor 42. As a result, there can be obtained substantially the same information as in a case where the posture of the ultrasonic sensor 42 is changed so as to cancel the deviation of the sensing reference position. That is, the signal processor 25 (one example of the second adjuster) indirectly adjusts the sensing reference position of the ultrasonic sensor 42.

The signal processor 25 is configured to output a drive signal BA1 for driving the first bracket actuator 46. The drive signal BA1 includes information for adjusting at least one of the position and the posture of the first bracket actuator 46 in the horizontal plane, and information for adjusting at least one of the position and the posture of the first bracket actuator 46 in the vertical plane. The respective information may be included in a single signal or may be provided with separate signals.

When the right front sensor system 2RF is mounted on the vehicle 100, the sensing reference positions of the sensors may deviate from desired positions due to tolerances of vehicle body components or the positional deviation of the housing 11 relative to the vehicle body. Accordingly, after the right front sensor system 2RF is mounted on the vehicle 100, the sensing reference positions of the LiDAR sensor 41 and the ultrasonic sensor 42 are readjusted. In the present embodiment, the LiDAR sensor 41 and the ultrasonic sensor 42 are supported by the first bracket 43. Therefore, by inputting an appropriate drive signal BA1 to the first bracket actuator 46, the sensing reference positions of the LiDAR sensor 41 and the ultrasonic sensor 42 can be adjusted collectively.

Therefore, even if the number of types of sensors to be mounted on the vehicle 100 increases, it is possible to reduce the burden of works for adjusting the sensing reference positions of the sensors relative to the vehicle 100.

In addition, according to the configuration of the present embodiment, a mechanical configuration for individually adjusting the sensing reference positions of the LiDAR sensor 41 and the ultrasonic sensor 42 can be eliminated, so that not only the enlargement of the first sensor unit 141 can be suppressed, but also the weight thereof can be reduced.

The right front sensor system 2RF includes a second sensor unit 161. The second sensor unit 161 includes a camera 61, a LiDAR sensor 62, a millimeter wave radar 63, a light source 641, a second bracket 65, and a second bracket actuator 60.

The light source 641 includes a plurality of light emitting elements 641*a* two-dimensionally arranged in addition to an optical system including at least one of a lens and a reflector. Examples of the light emitting element include a light emitting diode, a laser diode, and an organic EL element. Each of the light emitting elements 641*a* can be turned on and off individually, and a predetermined region is lighted by light emitted from the turned-on light emitting element 641*a*.

In the present embodiment, at least one of the lighting reference position and the lighting range can be moved in at least one of the up-down direction and the left-right direction by appropriately changing the light emitting element 641*a* to be turned on and the light emitting element 641*a* to be turned off. It should be noted that the "up-down direction" used herein does not necessarily have to coincide with the vertical direction or the up-down direction of the vehicle 100. Similarly, the "left-right direction" used herein does not necessarily have to coincide with the horizontal direction or the left-right direction of the vehicle 100.

In addition to or instead of the above-described configuration, a MEMS mechanism or a scan mechanism may be used to deflect the light emitted from the light source in a desired direction to move at least one of the lighting reference position and the lighting range in at least one of the up-down direction and the left-right direction.

The camera 61 outputs a sensing signal S3 corresponding to the captured image. The LiDAR sensor 62 outputs a sensing signal S4 corresponding to an attribute (intensity, wavelength or the like) of the sensed returned light. The millimeter wave radar 63 outputs a sensing signal S5 corresponding to an attribute (intensity or the like) of the received reflected wave. The sensing signal S3, the sensing signal S4, and the sensing signal S5 are inputted to the signal processor 25.

In the pre-shipment adjusting process of the right front sensor system 2RF, the sensing reference position of the camera 61 is adjusted. In the present embodiment, a deviation amount of the sensing reference position of the camera 61 from a predetermined position is first specified by a well-known technique. The signal processor 25 is configured to receive the sensing signal S3 from the camera 61, and to correct the information obtained from the sensing signal S3 based on the specified deviation amount. The correction may be performed on the sensing signal S3 itself, or may be performed on another signal or data corresponding to the sensing signal S3.

In the present embodiment, a mechanism for individually adjusting the posture of the camera 61 is not provided. Accordingly, when a deviation of the sensing reference position of the camera 61 is sensed, the posture of the camera 61 is not changed so as to cancel the deviation, but the information obtained from the camera 61 is corrected. More specifically, the information obtained from the camera 61 is corrected to information that would have been obtained if there was no deviation in the reference position sensed by the camera 61. As a result, there can be obtained substantially the same information as in a case where the posture of the camera 61 is changed so as to cancel the deviation of the sensing reference position. That is, it can be said that the signal processor 25 (one example of the first adjuster) indirectly adjusts the sensing reference position of the camera 61.

In the pre-shipment adjusting process of the right front sensor system 2RF, the sensing reference position of the LiDAR sensor 62 is adjusted. In the present embodiment, a deviation amount of the sensing reference position of the LiDAR sensor 62 from a predetermined position is first specified by a well-known technique. The signal processor 25 is configured to receive the sensing signal S4 from the LiDAR sensor 62, and to correct the information obtained from the sensing signal S4 based on the specified deviation amount. The correction may be performed on the sensing signal S4 itself, or may be performed on another signal or data corresponding to the sensing signal S4.

In the present embodiment, a mechanism for individually adjusting the posture of the LiDAR sensor 62 are not provided. Accordingly, when a deviation of the sensing reference position of the LiDAR sensor 62 is sensed, the posture of the LiDAR sensor 62 is not changed so as to cancel the deviation, but the information obtained from the LiDAR sensor 62 is corrected. More specifically, the information obtained from the LiDAR sensor 62 is corrected to information that would have been obtained if there was no deviation in the reference position sensed by the LiDAR sensor 62. As a result, there can be obtained substantially the same information as in a case where the posture of the LiDAR sensor 62 is changed so as to cancel the deviation of the sensing reference position. That is, it can be said that the signal processor 25 (one example of the second adjuster) indirectly adjusts the sensing reference position of the LiDAR sensor 62.

In the pre-shipment adjusting process of the right front sensor system 2RF, the sensing reference position of the millimeter wave radar 63 is adjusted. In the present embodiment, a deviation amount of the sensing reference position of the millimeter wave radar 63 from a predetermined position is first specified by a well-known technique. The signal processor 25 is configured to receive the sensing signal S5 from the millimeter wave radar 63, and to correct the information obtained from the sensing signal S5 based on the specified deviation amount. The correction may be performed on the sensing signal S5 itself, or may be performed on another signal or data corresponding to the sensing signal S5.

In the present embodiment, a mechanism for individually adjusting the posture of the millimeter wave radar 63 is not provided. Accordingly, when a deviation of the sensing reference position of the millimeter wave radar 63 is sensed, the posture of the millimeter wave radar 63 is not changed so as to cancel the deviation, but the information obtained from the millimeter wave radar 63 is corrected. More specifically, the information obtained from the millimeter wave radar 63 is corrected to information that would have been obtained if there was no deviation in the reference position sensed by the millimeter wave radar 63. As a result, there can be obtained substantially the same information as in a case where the posture of the millimeter wave radar 63 is changed so as to cancel the deviation of the sensing reference position. That is, the signal processor 25 (one example of the second adjuster) indirectly adjusts the sensing reference position of the millimeter wave radar 63.

In the pre-shipment adjusting process of the right front sensor system 2RF, the lighting reference position of the light source 641 is adjusted. In the present embodiment, a deviation amount of the sensing reference position of the light source 641 from a predetermined position is first specified by a well-known technique. The signal processor 25 (an example of the fourth adjuster) is configured to generate an adjustment signal A and input to the light source 641 based on the specified deviation amount. The adjustment signal A includes information for adjusting the lighting reference position of the light source 641 in at least one of the up-down direction and the left-right direction. More specifically, it contains information for determining the light emitting elements 641a to be turned on and the light emitting elements 641a to be turned off, so that the lighting reference position moves at least one of the up-down direction and the left-right direction.

The signal processor 25 is configured to output a drive signal BA2 for driving the second bracket actuator 60. The drive signal BA2 includes information for adjusting at least one of the position and the posture of the second bracket actuator 60 in the horizontal plane, and information for adjusting at least one of the position and the posture of the second bracket actuator 60 in the vertical plane. The respective information may be included in a single signal or may be provided with separate signals.

When the right front sensor system 2RF is mounted on the vehicle 100, the sensing reference positions of the sensors may deviate from desired positions due to tolerances of vehicle body components or the positional deviation of the housing 11 relative to the vehicle body. Therefore, after the right front sensor system 2RF is mounted on the vehicle 100, the sensing reference positions of the camera 61, the LiDAR sensor 62, and the millimeter wave radar 63 are readjusted. In the present embodiment, the camera 61, the LiDAR sensor 62, and the millimeter wave radar 63 are supported by the second bracket 65. Therefore, by inputting an appropriate drive signal BA2 to the second bracket actuator 60, the sensing reference positions of the camera 61, the LiDAR sensor 62, and the millimeter wave radar 63 can be collectively adjusted.

Therefore, even if the number of types of sensors to be mounted on the vehicle 100 increases, it is possible to reduce the burden of works for adjusting the sensing reference positions of the sensors relative to the vehicle 100.

Further, according to the configuration of the present embodiment, a mechanical configuration for individually adjusting the sensing reference positions of the camera 61, the LiDAR sensor 62, and the millimeter wave radar 63 can be eliminated, so that not only the enlargement of the second sensor unit 161 can be suppressed, but also the weight thereof can be reduced.

In the present embodiment, the signal processor 25 is responsible for receiving and correcting the sensing signals S1 to S5, as well as for outputting the drive signals BA1 and BA2. However, the portions responsible for receiving and correcting the sensing signals S1 to S5 and the portions responsible for outputting the driving signals BA1 and BA2 may have independent configurations.

In the present embodiment, the first sensor unit 141 includes the LiDAR sensor 41 and the ultrasonic sensor 42, and the second sensor unit 161 includes the camera 61, the LiDAR sensor 62, and the millimeter wave radar 63. However, the sensor units are configured to include at least two of the camera, the LiDAR sensor, the millimeter wave radar, and the ultrasonic sensor in accordance with a target to be sensed, a sensing range, a sensing distance, and the like. The number of each sensor can also be appropriately determined.

In the present embodiment, the first sensor unit 141 and the second sensor unit 161 are housed in a common housing 11. However, the first sensor unit 141 and the second sensor unit 161 may be housed in different housings.

In the present embodiment, the right front sensor system 2RF is exemplified as the sensor system including plural types of sensors. However, the configuration described with reference to the right front sensor system 2RF is also applicable to a left front sensor system to be disposed in a left front corner portion of the vehicle 100 illustrated in FIG. 1, a left rear sensor system to be disposed in a left rear corner portion of the vehicle 100 illustrated in FIG. 1 and a right rear sensor system 1RB to be disposed in a right rear corner portion of the vehicle 100 illustrated in FIG. 1. For example, the left front sensor system may have a configuration that is symmetrical with the right front sensor system 2RF relative to the left-right direction. The right rear sensor system may have a configuration that is symmetrical with the right front sensor system 2RF relative to the front-rear direction. The rear left sensor system may have a configuration symmetrical with the rear right sensor system relative to the left-right direction.

Figure 4:
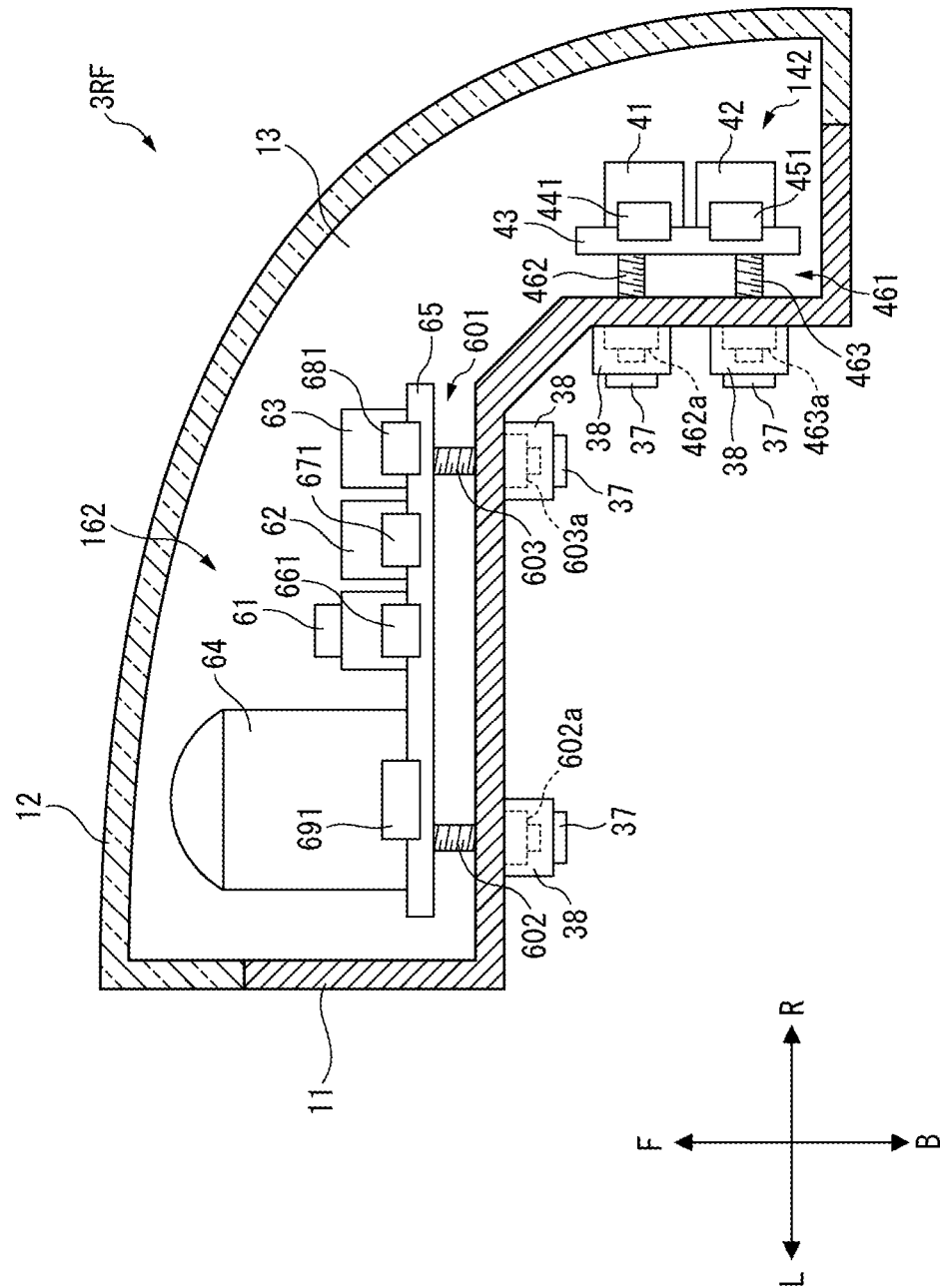
FIG. 4 illustrates a sensor system according to a third embodiment.

FIG. 4 schematically illustrates a configuration of a right front sensor system 3RF according to a third embodiment. Components that are the same as or equivalent to those of the right front sensor system 1RF according to the first embodiment are assigned with the same reference numerals, and repetitive descriptions for those will be omitted.

The right front sensor system 3RF includes a first sensor unit 142. The first sensor unit 142 includes a LiDAR sensor 41, an ultrasonic sensor 42, a first bracket 43, a first sensor adjusting mechanism 441, a second sensor adjusting mechanism 451, and a first bracket adjusting mechanism 461.

The first sensor adjusting mechanism 441 is a so-called aiming screw mechanism, and is configured to change the posture of the LiDAR sensor 41 with respect to the first bracket 43 in a horizontal plane (in a plane including the front-rear direction and the left-right direction in FIG. 4) and in a vertical plane (in a plane including the left-right direction and the up-down direction in FIG. 4). It should be noted that the "horizontal plane" used herein need not coincide with a strict horizontal plane. Likewise, the "vertical plane" used herein need not coincide with a strict vertical plane. Since the configuration of the aiming screw mechanism itself is well known, a detailed description thereof will be omitted.

The second sensor adjusting mechanism 451 is a so-called aiming screw mechanism, and is configured to change the posture of the ultrasonic sensor 42 with respect to the first bracket 43 in a horizontal plane (in a plane including the front-rear direction and the left-right direction in FIG. 4) and in a vertical plane (in a plane including the left-right direction and the up-down direction in FIG. 4). It should be noted that the "horizontal plane" used herein need not coincide with a strict horizontal plane. Likewise, the "vertical plane" used herein need not coincide with a strict vertical plane. Since the configuration of the aiming screw mechanism itself is well known, a detailed description thereof will be omitted.

The first bracket adjusting mechanism 461 (one example of the third adjuster) is a mechanism for adjusting the posture of the first bracket 43. Specifically, the first bracket adjusting mechanism 461 includes a first horizontal adjusting screw 462 and a first vertical adjusting screw 463.

The first horizontal adjusting screw 462 extends so as to penetrate the housing 11. The first horizontal adjusting screw 462 is connected to the first bracket 43 via a joint (not illustrated). A head portion 462a of the first horizontal adjusting screw 462 is disposed outside the housing 11. When the head portion 462a is rotated by a predetermined tool, the rotation of the first horizontal adjusting screw 462 is converted into a motion for changing the posture of the first bracket 43 in a horizontal plane (in a plane including the front-rear direction and the left-right direction in FIG. 4) by the joint. It should be noted that the "horizontal plane" used herein need not coincide with a strict horizontal plane. Since the construction itself of the joint is well known, detailed descriptions thereof will be omitted.

The first vertical adjusting screw 463 extends so as to penetrate the housing 11. The first vertical adjusting screw 463 is connected to the first bracket 43 via a joint (not illustrated). A head portion 463a of the first vertical adjusting screw 463 is disposed outside the housing 11. When the head portion 463a is rotated by a predetermined tool, the rotation of the first vertical adjusting screw 463 is converted into a motion for changing the posture of the first bracket 43 in the vertical plane (in the plane including the left-right direction and the up-down direction in FIG. 4) by the joint. It should be noted that the "vertical plane" used herein need not coincide with a strict vertical plane. Since the construction itself of the joint is well known, detailed descriptions thereof will be omitted.

In a pre-shipment adjusting process of the right front sensor system 3RF, the sensing reference position of the LiDAR sensor 41 is adjusted. In the present embodiment, the posture of the LiDAR sensor 41 with respect to the first bracket 43 (or the housing 11) is adjusted by operating the first sensor adjusting mechanism 441 with a predetermined tool.

In the pre-shipment adjusting process of the right front sensor system 3RF, the sensing reference position of the ultrasonic sensor 42 is adjusted. In the present embodiment, the posture of the ultrasonic sensor 42 with respect to the first bracket 43 (or the housing 11) is adjusted by operating the second sensor adjusting mechanism 451 with a predetermined tool.

When the right front sensor system 3RF is mounted on the vehicle 100, the sensing reference positions of the sensors may deviate from desired positions due to tolerances of vehicle body components or the positional deviation of the housing 11 relative to the vehicle body. Accordingly, after the right front sensor system 3RF is mounted on the vehicle 100, the sensing reference positions of the LiDAR sensor 41 and the ultrasonic sensor 42 are readjusted. In the present embodiment, the LiDAR sensor 41 and the ultrasonic sensor 42 are supported by the first bracket 43. Therefore, by operating the first bracket adjusting mechanism 461 with the predetermined tool, the sensing reference positions of the LiDAR sensor 41 and the ultrasonic sensor 42 can be adjusted collectively.

Therefore, even if the number of types of sensors to be mounted on the vehicle 100 increases, it is possible to reduce the burden of works for adjusting the sensing reference positions of the sensors relative to the vehicle 100.

The right front sensor system 3RF includes a second sensor unit 162. The second sensor unit 162 includes a camera 61, a LiDAR sensor 62, a millimeter wave radar 63, a light source 64, a second bracket 65, a third sensor adjusting mechanism 661, a fourth sensor adjusting mechanism 671, a fifth sensor adjusting mechanism 681, a light source adjusting mechanism 691, and a second bracket adjusting mechanism 601.

The third sensor adjusting mechanism 661 is a so-called aiming screw mechanism, and is configured to change the posture of the camera 61 with respect to the second bracket 65 in a horizontal plane (in a plane including the front-rear direction and the left-right direction in FIG. 4) and in a vertical plane (in a plane including the left-right direction and the up-down direction in FIG. 4). It should be noted that the "horizontal plane" used herein need not coincide with a strict horizontal plane. Likewise, the "vertical plane" used herein need not coincide with a strict vertical plane. Since the configuration of the aiming screw mechanism itself is well known, a detailed description thereof will be omitted.

The fourth sensor adjusting mechanism 671 is a so-called aiming screw mechanism, and is configured to change the posture of the LiDAR sensor 62 with respect to the second bracket 65 in a horizontal plane (in a plane including the front-rear direction and the left-right direction in FIG. 4) and in a vertical plane (in a plane including the left-right direction and the up-down direction in FIG. 4). It should be noted that the "horizontal plane" used herein need not coincide with a strict horizontal plane. Likewise, the "vertical plane" used herein need not coincide with a strict vertical plane. Since the configuration of the aiming screw mechanism itself is well known, a detailed description thereof will be omitted.

The fifth sensor adjusting mechanism 681 is a so-called aiming screw mechanism, and is configured to change the posture of the millimeter wave radar 63 with respect to the second bracket 65 in a horizontal plane (in a plane including the front-rear direction and the left-right direction in FIG. 4) and in a vertical plane (in a plane including the left-right direction and the up-down direction in FIG. 4). It should be noted that the "horizontal plane" used herein need not coincide with a strict horizontal plane. Likewise, the "vertical plane" used herein need not coincide with a strict vertical plane. Since the configuration of the aiming screw mechanism itself is well known, a detailed description thereof will be omitted.

The light source adjusting mechanism 691 is a so-called aiming screw mechanism, and is configured to change the posture of the light source 64 with respect to the second bracket 65 in a horizontal plane (in a plane including the front-rear direction and the left-right direction in FIG. 4) and in a vertical plane (in a plane including the left-right direction and the up-down direction in FIG. 4). It should be noted that the "horizontal plane" used herein need not coincide with a strict horizontal plane. Likewise, the "vertical plane" used herein need not coincide with a strict vertical plane. Since the configuration of the aiming screw mechanism itself is well known, a detailed description thereof will be omitted.

The second bracket adjusting mechanism 601 (one example of the third adjuster) is a mechanism for adjusting the posture of the second bracket 65. Specifically, the second bracket adjusting mechanism 601 includes a second horizontal adjusting screw 602 and a second vertical adjusting screw 603.

The second leveling screw 602 extends so as to penetrate the housing 11. The second horizontal adjusting screw 602 is connected to the second bracket 65 via a joint (not illustrated). A head portion 602a of the second leveling screw 602 is disposed outside the housing 11. When the head portion 602a is rotated by a predetermined tool, the rotation of the second horizontal adjusting screw 602 is converted into a motion for changing the posture of the second bracket 65 in a horizontal plane (in a plane including the front-rear direction and the left-right direction in FIG. 4) by the joint. It should be noted that the "horizontal plane" used herein need not coincide with a strict horizontal plane. Since the construction itself of the joint is well known, detailed descriptions thereof will be omitted.

The second vertical adjusting screw 603 extends so as to penetrate the housing 11. The second vertical adjusting screw 603 is connected to the second bracket 65 via a joint (not illustrated). A head portion 603a of the second vertical adjusting screw 603 is disposed outside the housing 11. When the head portion 603a is rotated by a predetermined tool, the rotation of the second vertical adjusting screw 603 is converted into a motion for changing the posture of the second bracket 65 in the vertical plane (in the plane including the left-right direction and the up-down direction in FIG. 4) by the joint. It should be noted that the "vertical plane" used herein need not coincide with a strict vertical plane. Since the construction itself of the joint is well known, detailed descriptions thereof will be omitted.

In a pre-shipment adjusting process of the right front sensor system 3RF, the sensing reference position of the camera 61 is adjusted. In the present embodiment, the posture of the camera 61 with respect to the second bracket 65 (or the housing 11) is adjusted by operating the third sensor adjusting mechanism 661 with a predetermined tool.

In the pre-shipment adjusting process of the right front sensor system 3RF, the sensing reference position of the LiDAR sensor 62 is adjusted. In the present embodiment, the posture of the LiDAR sensor 62 with respect to the second bracket 65 (or the housing 11) is adjusted by operating the fourth sensor adjusting mechanisms 671 with a predetermined tool.

In the pre-shipment adjusting process of the right front sensor system 3RF, the sensing reference position of the millimeter wave radar 63 is adjusted. In the present embodiment, the posture of the millimeter wave radar 63 with respect to the second bracket 65 (or the housing 11) is adjusted by operating the fifth sensor adjusting mechanism 681 with a predetermined tool.

In the pre-shipment adjusting process of the right front sensor system 3RF, the lighting reference position of the light source 64 is adjusted. In the present embodiment, the posture of the light source 64 with respect to the second bracket 65 (or the housing 11) is adjusted by operating the light source adjusting mechanism 691 with a predetermined tool.

When the right front sensor system 3RF is mounted on the vehicle 100, the sensing reference positions of the sensors may deviate from desired positions due to tolerances of vehicle body components or the positional deviation of the housing 11 relative to the vehicle body. Therefore, after the right front sensor system 3RF is mounted on the vehicle 100, the sensing reference positions of the camera 61, the LiDAR sensor 62, and the millimeter wave radar 63 are readjusted. In the present embodiment, the camera 61, the LiDAR sensor 62, and the millimeter wave radar 63 are supported by the second bracket 65. Therefore, by operating the second bracket adjusting mechanism 601 with the predetermined tool, the sensing reference positions of the camera 61, the LiDAR sensor 62, and the millimeter wave radar 63 can be adjusted collectively.

Therefore, even if the number of types of sensors to be mounted on the vehicle 100 increases, it is possible to reduce the burden of works for adjusting the sensing reference positions of the sensors relative to the vehicle 100.

The right front sensor system 3RF includes RFID tags 37 (one example of the identifier). Each of the RFID tags 37 holds information to be identified by the vehicle 100. For example, a non-contact communication device (not illustrated) is provided on the side of the vehicle 100. When the right front sensor system 3RF is mounted on the vehicle 100, a control device (e.g., ECU) of the vehicle 100 obtains information held in the RFID tags 37 through the non-contact communication device. If the vehicle 100 is unable to obtain the information held in the RFID tags 37, the function of the vehicle 100 may be partially restricted (e.g., the engine cannot be started) or an alert may be constantly displayed.

A head portion 462a of the first horizontal adjusting screw 462 is covered by a cover 38. The RFID tag 37 is mounted on the cover 38. The cover 38 is firmly crimped to the head portion 462a, so that the RFID tag 37 is configured to be destroyed in a case where the cover 38 is removed from the head portion 462a.

Similarly, the head portion 463a of the first vertical adjusting screw 463 is covered by the cover 38. The RFID tag 37 is mounted on the cover 38. The cover 38 is firmly crimped to the head portion 463a, so that the RFID tag 37 is configured to be destroyed in a case where the cover 38 is removed from the head portion 463a.

Similarly, the head portion 602a of the second leveling screw 602 is covered by the cover 38. The RFID tag 37 is mounted on the cover 38. The cover 38 is firmly crimped to the head portion 602a, so that the RFID tag 37 is configured to be destroyed in a case where the cover 38 is removed from the head portion 602a.

Similarly, the head portion 603a of the second vertical adjusting screw 603 is covered by the cover 38. The RFID tag 37 is mounted on the cover 38. The cover 38 is firmly crimped to the head portion 603a, so that the RFID tag 37 is configured to be destroyed in a case where the cover 38 is removed from the head portion 603a.

The LiDAR sensor 41 and the ultrasonic sensor 42 are used, for example, to obtain information to be used for the self-driving. Therefore, after the right front sensor system 1RF is mounted on the vehicle 100, it is not preferable that an ordinary user can easily adjust the sensing reference positions of these sensors.

Similarly, the camera 61, the LiDAR sensor 62, and the millimeter wave radar 63 are used, for example, to obtain information to be used for the self-driving. Therefore, after the right front sensor system 1RF is mounted on the vehicle 100, it is not preferable that an ordinary user can easily adjust the sensing reference positions of these sensors.

According to the configuration of the present embodiment, when the ordinary user removes the cover 38 to operate the first bracket adjusting mechanism 461 or the second bracket adjusting mechanism 601, the RFID tag 37 will be destroyed. As a result, the vehicle 100 is disabled to identify the information held by the RFID tag 37. In such a case, since a portion of the function of the vehicle 100 is limited, or an alert is constantly displayed, it is possible to cause the ordinary user to hesitate to execute the adjustment action.

In the present embodiment, the RFID tags 37 is attached to the covers 38 that cover portions of the first bracket adjusting mechanism 461 and the second bracket adjusting mechanism 601. According to such a configuration, after a qualified adjustment is performed by a maintenance personnel or the like, the original condition can be restored by mounting the covers 38 provided with the RFID tags 37. Therefore, it is possible to reduce the burden of works to be performed by the maintenance personnel or the like.

However, the RFID tags 37 need not necessarily be provided on the covers 38. As long as the RFID tag 37 is destroyed by operating the first bracket adjusting mechanism 461 or the second bracket adjusting mechanism 601, the RFID tag 37 may be directly attached to the head portion or the like of each screw to which a tool contacts.

The identifier is not limited to the RFID tag 37 as long as the data to be identified by the vehicle 100 can be held. The RFID tag 37 may be appropriately replaced with a magnet or the like holding magnetic information to be read by a magnetic sensor.

In the present embodiment, the first sensor unit 142 includes the LiDAR sensor 41 and the ultrasonic sensor 42, and the second sensor unit 162 includes the camera 61, the LiDAR sensor 62, and the millimeter wave radar 63. However, the sensor units are configured to include at least two of the camera, the LiDAR sensor, the millimeter wave radar, and the ultrasonic sensor in accordance with a target to be sensed, a sensing range, a sensing distance, and the like. The number of each sensor can also be appropriately determined.

In the present embodiment, the first sensor unit 142 and the second sensor unit 162 are housed in a common housing 11. However, the first sensor unit 142 and the second sensor unit 162 may be housed in different housings.

Figure 5:
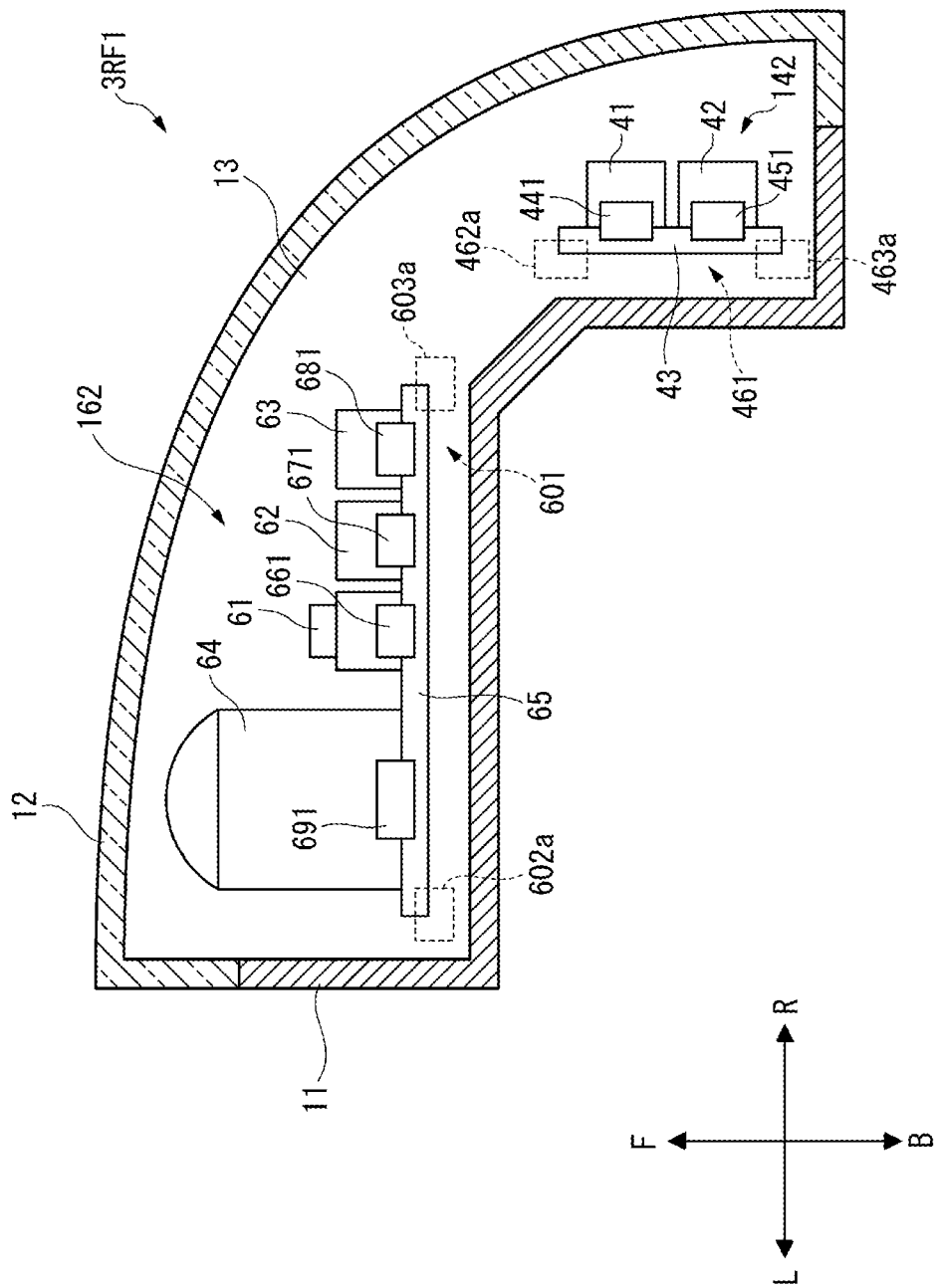
FIG. 5 illustrates a sensor system according to a modification of the third embodiment.

FIG. 5 schematically illustrates a right front sensor system 3RF1 according to a modification of the third embodiment. Although not illustrated, a left front sensor system mounted on the left front corner of the vehicle 100 has a configuration symmetrical with the right front sensor system 3RF1 relative to the left-right direction. Components that are the same as or equivalent to those of the right front sensor system 3RF according to the third embodiment are assigned with the same reference numerals, and repetitive descriptions for those will be omitted.

In this modification, the first horizontal adjusting screw 462 and the first vertical adjusting screw 463 of the first bracket adjusting mechanism 461 extend so as to penetrate a lower face of the housing 11. Accordingly, the head portion 462a of the first horizontal adjusting screw 462 and the head portion 463a of the first vertical adjusting screw 463 are exposed on the lower face of the housing 11.

In this modification, the second horizontal adjusting screw 602 and the second vertical adjusting screw 603 of the second bracket adjusting mechanism 601 extend through the lower face of the housing 11. Accordingly the head portion 602a of the second horizontal adjusting screw 602 and the head portion 603a of the second vertical adjusting screw 603 are exposed on the lower face of the housing 11.

In other words, the first bracket adjusting mechanism 461 and the second bracket adjusting mechanism 601 are disposed at positions that are not visually recognizable or not operable from an upper side of the vehicle 100.

According to such a configuration, since it is necessary to operate the first bracket adjusting mechanism 461 and the second bracket adjusting mechanism 601 from a lower side of the vehicle 100, it is possible to cause the ordinary user to hesitate to execute the adjustment action. In this instance, the RFID tags 37 need not necessarily be provided.

The same effect can be obtained by arranging the first bracket adjusting mechanism 461 and the second bracket adjusting mechanism 601 at positions that are not visually recognizable or not operable from a front side of the vehicle 100.

In the present embodiment, the right front sensor system 3RF (3RF1) is exemplified as the sensor system including plural types of sensors. However, the configuration described with reference to the right front sensor system 3RF (3RF1) is also applicable to a left front sensor system to be disposed in a left front corner portion of the vehicle 100 illustrated in FIG. 1, a left rear sensor system to be disposed in a left rear corner portion of the vehicle 100 illustrated in FIG. 1 and a right rear sensor system 1RB to be disposed in a right rear corner portion of the vehicle 100 illustrated in FIG. 1. For example, the left front sensor system may have a configuration that is symmetrical with the right front sensor system 3RF (3RF1) relative to the left-right direction. The right rear sensor system may have a configuration that is symmetrical with the right front sensor system 3RF (3RF1) relative to the front-rear direction. The rear left sensor system may have a configuration symmetrical with the rear right sensor system relative to the left-right direction.

Figure 6:
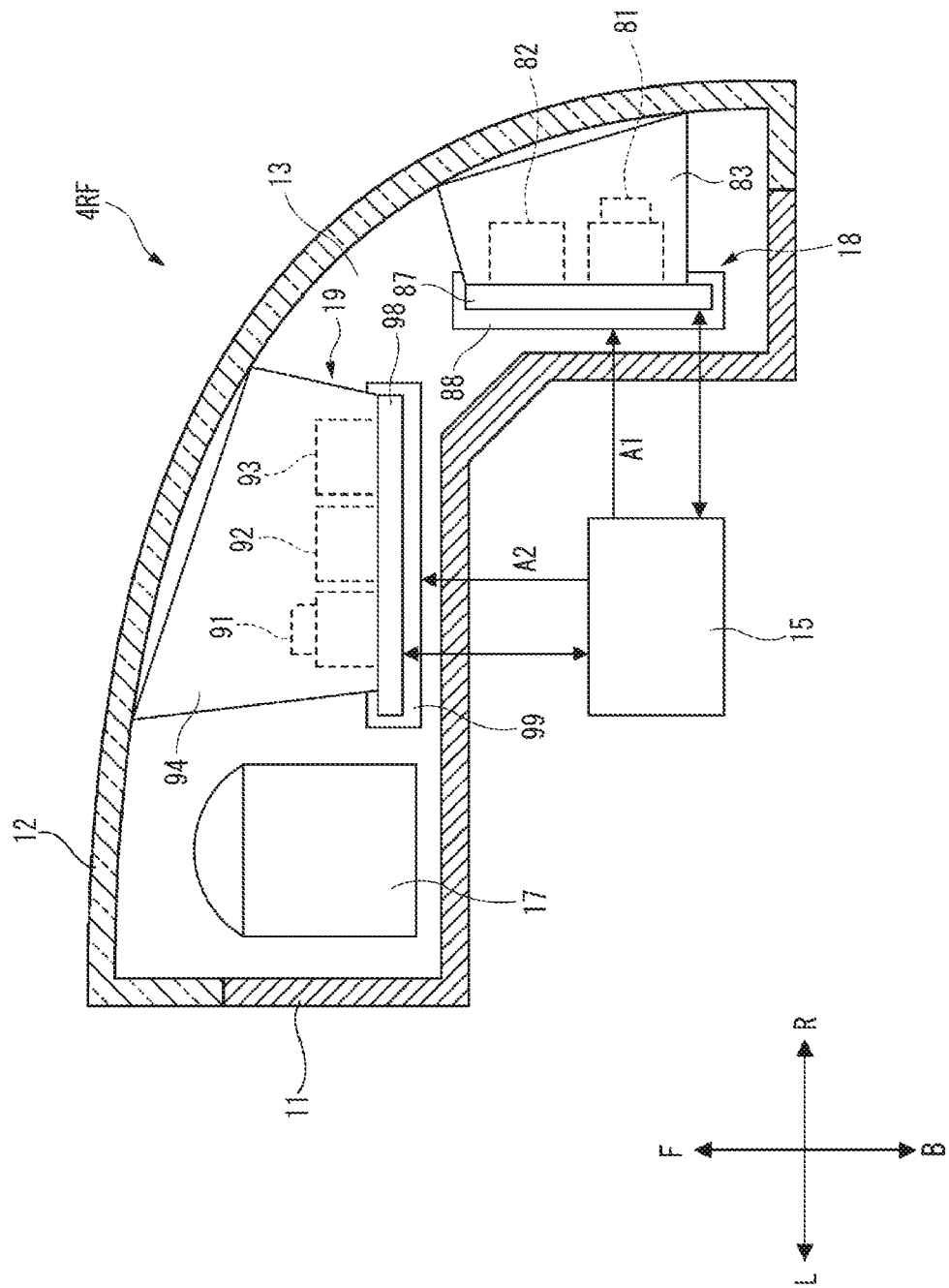
FIG. 6 illustrates a lamp device according to a fourth embodiment.

FIG. 6 schematically illustrates a configuration of a right front lamp 4RF (one example of the lamp device) according to a fourth embodiment. Components that are the same as or equivalent to those of the right front sensor system 1RF according to the first embodiment are assigned with the same reference numerals, and repetitive descriptions for those will be omitted.

The right front lamp 4RF includes a housing 11 and a translucent cover 12 for partitioning a lamp chamber 13. A head lamp 17 is housed in the lamp chamber 13. The head lamp 17 includes an optical system including at least one of a lens and a reflector. The light emitted from the head lamp 17 passes through the translucent cover 12 and lights at least ahead of the vehicle 100.

The right front ramp 4RF includes a first sensor module 18. The first sensor module 18 includes a visible light camera 81, a LiDAR sensor 82, and a shielding member 83.

The visible light camera 81 (an example of the first sensor) captures an image of at least on the right of the vehicle 100 (an example of the outside of the vehicle). That is, the visible light camera 81 is a sensor that senses information of at least on the right of the vehicle 100.

The LiDAR sensor 82 (an example of the second sensor) includes a light emitter that emits non-visible light, and a light receiver that senses return light as a result of the non-visible light being reflected by at least an object that is present at least on the right of the vehicle 100 (an example of the outside of the vehicle). In the present embodiment, infrared light having a wavelength of 905 nm is used as the non-visible light.

The LiDAR sensor 82 can obtain the distance to the object associated with the returned light, for example, based on the time period from the time when the non-visible light is emitted in a certain direction to the time when the returned light is sensed. Further, by accumulating such distance data in association with the sensing position, it is possible to obtain information as to the shape of the object associated with the returned light. Additionally or alternatively, information as to an attribute such as the material of the object associated with the returned light can be obtained based on the difference in wavelength between the emitted light and the returned light. Additionally or alternatively, information about the color of the object, such as a white line on the road surface, can be obtained, for example, based on the difference in reflectivity of the returned light from the road surface. That is, the LiDAR sensor 82 is a sensor that senses information of at least on the right of the vehicle 100 in a manner different from that of the visible light camera 81.

Figure 7:
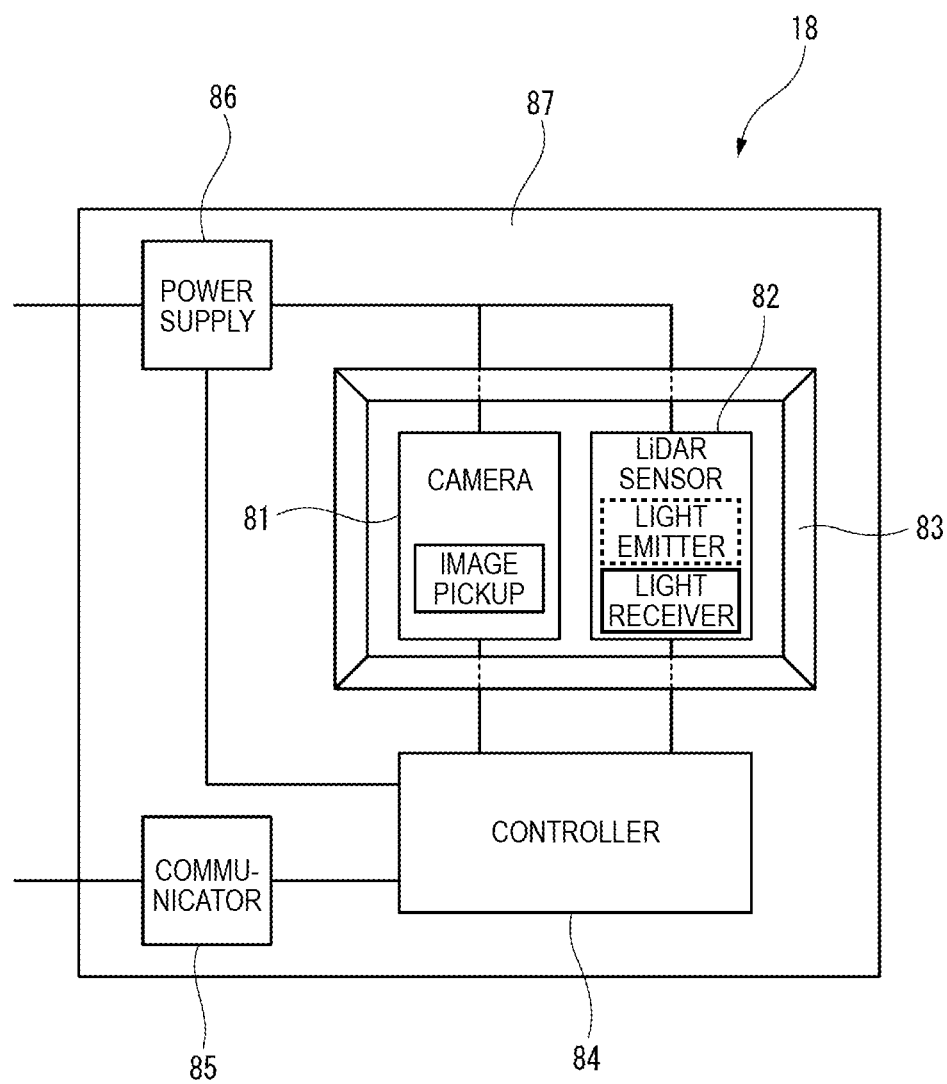
FIG. 7 illustrates a configuration of a first sensor module of FIG. 6.

The shielding member 83 is a cylindrical hollow member having a side wall painted in black. FIG. 7 schematically illustrates a configuration of the first sensor module 18. As illustrated in FIG. 6 and FIG. 7, the shielding member 83 is provided so as to surround at least an image pickup of the visible light camera 81 (an example of the sensing section of the first sensor) and at least the light receiver of the LiDAR sensor 82 (an example of the sensing section of the second sensor). The "image pickup" of the visible light camera 81 includes not only an image pickup element but also an optical component such as a lens through which light to be incident on the image pickup element passes.

As used herein, the expression "surrounding A and B" is intended to depict a configuration that collectively surrounds A and B and to distinguish the same from configurations that individually surround A and B. That is, the side wall forming the shielding member 83 is not provided between the visible light camera 81 and the LiDAR sensor 82.

More specifically, the shielding member 83 is disposed so as to prevent the light emitted from the head lamp 17 from directly or indirectly entering the image pickup of the visible light camera 81, while not preventing the return light as a result of the non-visible light emitted from the light emitter of the LiDAR sensor 82 being reflected by an object from entering the light receiver of the LiDAR sensor 82.

It is needless to say that the shielding member 83 is disposed so as not to block the respective fields of view of the visible light camera 81 and the LiDAR sensor 82. Here, the "field of view of the visible light camera 81" means a range in which the visible light camera 81 can obtain significant information, and does not necessarily mean the maximum field of view of the visible light camera 81. The "field of view of the LiDAR sensor 82" means a range in which the LiDAR sensor 82 can obtain significant information, and does not necessarily mean the maximum field of view of the LiDAR sensor 82.

The shielding member 83 is configured to shield at least visible light in a wavelength range for which the visible light camera 81 has sensitivity. Here, the term "shield" comprehends not only a case where an object to be shielded is not permitted to pass through, but also a case where the object to be shielded is attenuated to such an extent that would not affect the sensing by the image pickup of the visible light camera 81 and the sensing by the light receiver of the LiDAR sensor 82.

The shielding member 83 may also be configured to shield non-visible light in a wavelength range for which the LiDAR sensor 82 is sensitive.

In order to prevent the light emitted from the head lamp 17 from directly or indirectly entering the image pickup of the visible light camera 81, a distal end of the side wall of the shielding member 83 is disposed so as to contact an inner face of the translucent cover 12 or so as to minimize the distance from the translucent cover 12.

The right front ramp 4RF includes a second sensor module 19. The second sensor module 19 includes a visible light camera 91, a LiDAR sensor 92, a millimeter wave radar 93, and a shielding member 94.

The visible light camera 91 (an example of the first sensor) captures an image of at least ahead of the vehicle 100 (an example of the outside of the vehicle). That is, the visible light camera 91 is a sensor that senses information of at least ahead of the vehicle 100.

The LiDAR sensor 92 (an example of the second sensor) includes a light emitter that emits non-visible light, and a light receiver that senses return light as a result of the non-visible light being reflected by at least an object in front of the vehicle 100 (an example of the outside of the vehicle).

In the present embodiment, infrared light having a wavelength of 905 nm is used as the non-visible light.

Since the LiDAR sensor 92 has the same configuration as the LiDAR sensor 82, repetitive detailed descriptions thereof will be omitted. The LiDAR sensor 92 is a sensor that senses information of an area ahead of the vehicle 100 in a manner different from the visible light camera 91.

The millimeter wave radar 93 (an example of the second sensor) has a transmitter for transmitting a millimeter wave and a receiver for receiving a reflected wave as a result of the millimeter wave being reflected by at least an object that is present in at least ahead of the vehicle 100 (an example of the outside of the vehicle). In the present embodiment, a millimeter wave having a frequency of 76 GHz is used. Examples of other frequencies include 24 GHz, 26 GHz, 79 GHz, etc.

The millimeter wave radar 93 can obtain the distance to the object associated with the reflected wave, for example, based on the time period from the time when the millimeter wave is transmitted in a certain direction to the time when the reflected wave is received. Further, by accumulating such distance data in association with the sensing position, it is possible to obtain information as to the shape of the object associated with the reflected wave. That is, the millimeter wave radar 93 is a sensor that senses information of at least ahead of the vehicle 100 by a manner different from the visible light camera 91 and the LiDAR sensor 92.

The shielding member 94 is a cylindrical hollow member having a side wall painted in black. FIG. 8 schematically illustrates a configuration of the second sensor module 19. As illustrated in FIG. 6 and FIG. 8, the shielding member 94 is provided so as to surround at least an image pickup of the visible light camera 91 (an example of the sensing section of the first sensor), at least the light receiver of the LiDAR sensor 82 (an example of the sensing section of the second sensor), and at least the receiver of the millimeter wave radar 93 (an example of the sensing section of the second sensor). The "image pickup" of the visible light camera 91 includes not only an image pickup element but also an optical component such as a lens through which light to be incident on the image pickup element passes. The side wall forming the shielding member 94 is not provided between the visible light camera 91 and the LiDAR sensor 92, as well as between the LiDAR sensor 92 and the millimeter wave radar 93.

More specifically, the shielding member 94 is disposed so as to prevent the light emitted from the head lamp 17 from directly or indirectly entering the image pickup of the visible light camera 91, while not preventing the return light as a result of the non-visible light emitted from the light emitter of the LiDAR sensor 92 being reflected by an object from entering the light receiver of the LiDAR sensor 92, and not preventing the reflected wave as a result of the millimeter wave emitted from the transmitter of the millimeter wave radar 93 being reflected by an object from entering the receiver of the millimeter wave radar 93.

It is needless to say that the shielding member 94 is disposed so as not to block the respective fields of view of the visible light camera 91, the LiDAR sensor 92, and the millimeter wave radar 93. Here, the "field of view of the visible light camera 91" means a range in which the visible light camera 91 can obtain significant information, and does not necessarily mean the maximum field of view of the visible light camera 91. The "field of view of the LiDAR sensor 92" means a range in which the LiDAR sensor 92 can obtain significant information, and does not necessarily mean the maximum field of view of the LiDAR sensor 92.

The "field of view of the millimeter wave radar 93" means a range in which the millimeter wave radar 93 can obtain significant information, and does not necessarily mean the maximum field of view of the millimeter wave radar 93.

The shielding member 94 is configured to shield at least visible light in a wavelength range for which the visible light camera 91 has sensitivity. Here, the term "shield" comprehends not only a case where an object to be shielded is not permitted to pass through, but also a case where the object to be shielded is attenuated to such an extent that would not affect the sensing by the image pickup of the visible light camera 91, the sensing by the light receiver of the LiDAR sensor 92, and the sensing by the receiver of the millimeter wave radar 93.

The shielding member 94 may be configured to shield at least one of a non-visible light in a wavelength range for which the LiDAR sensor 92 has sensitivity and a millimeter wave in a wavelength range for which the millimeter wave radar 93 has sensitivity.

In order to prevent the light emitted from the head lamp 17 from directly or indirectly entering the image pickup of the visible light camera 91, a distal end of the side wall of the shielding member 94 is disposed so as to contact an inner face of the translucent cover 12 or so as to minimize the distance from the translucent cover 12.

From the viewpoint of efficiently acquiring information around the vehicle and from the viewpoint of design, it is demanded to dispose a sensor for obtaining information of the outside of the vehicle at interior spaces of the lamp devices that are disposed at four corners of the vehicle. However, there is a possibility that the light emitted from the light source included in the lamp device is directly or indirectly incident on the image pickup of the visible light camera through internal reflection or the like. In order to suppress the adverse influence of the incident light on the information to be sensed, it is necessary to provide a shielding member for covering the image pickup of the visible light camera.

On the other hand, in order to obtain more diverse external information of the vehicle, it is necessary to increase the types of sensors to be mounted on the lamp device. From the viewpoint of suppressing the enlargement of the lamp device, it is desirable that a plurality of sensors are arranged close to each other. However, a shielding member provided to suppress the incidence of undesired light on the image pickup of the visible light camera may obstruct the sensing of information performed by another sensor such as a LiDAR sensor or a millimeter wave radar.

In the present embodiment, the shielding member 83 of the first sensor module 18 is disposed so as to surround the image pickup of the visible light camera 81 and at least the light receiver of the LiDAR sensor 82. Thus, the shielding member 83 suppresses direct or indirect incident of the light emitted from the head lamp 17 on the image pickup of the visible light camera 81 while not obstructing the information sensing performed by the LiDAR sensor 82. Accordingly, it is possible to provide a configuration capable of obtaining more diverse external information of the vehicle 100 while suppressing enlargement of the right front ramp 4RF.

Similarly, the shielding member 94 of the second sensor module 19 is disposed so as to surround the image pickup of the visible light camera 91, at least the light receiver of the LiDAR sensor 92, and at least the receiver of the millimeter wave radar 93. Thus, the shielding member 94 suppresses direct or indirect incident of the light emitted from the head lamp 17 on the image pickup of the visible light camera 91 while not obstructing the information sensing performed by the LiDAR sensor 92 and the information sensing performed by the millimeter wave radar 93. Accordingly, it is possible to provide a configuration capable of obtaining more diverse external information of the vehicle 100 while suppressing enlargement of the right front ramp 4RF.

As illustrated in FIG. 7, the first sensor module 18 includes a controller 84, a communicator 85, and a power supply 86.

The controller 84 is communicably connected to the signal processor 15 illustrated in FIG. 6 via the communicator 85. The signal processor 15 is realized by a control device such as an ECU mounted on the vehicle 100. The controller 84 is configured to receive a control signal from the signal processor 15 via the communicator 85, and to control the operations of the visible light camera 81 and the LiDAR sensor 82 based on the control signal.

The power supply 86 is configured to receive power from a power source (not illustrated) mounted on the vehicle 100, and to supply the power to the visible light camera 81, the LiDAR sensor 82, and the controller 84.

As illustrated in FIG. 6 and FIG. 7, the first sensor module 18 includes a supporting member 87. The supporting member 87 supports the visible light camera 81, the LiDAR sensor 82, the shielding member 83, the controller 84, the communicator 85, and the power supply 86. The supporting member 87 also serves as a mounting board for sensor circuits including the visible light camera 81, the LiDAR sensor 82, the controller 84, the communicator 85, and the power supply 86.

That is, plural types of sensors differing in sensing manners (the visible light camera 81 and the LiDAR sensor 82), a shielding member 83 surrounding the sensing sections of the plural types of sensors, and circuits for operating the plural types of sensors are modularized on the supporting member 87. Thus, it is possible to provide a configuration that can facilitate mounting work to the right front lamp 4RF while more diverse external information of the vehicle 100 can be obtained.

In addition, since the controller 84, the communicator 85, and the power supply 86 are shared by the visible light camera 81 and the LiDAR sensor 82, it is possible to suppress the enlargement and the cost-increasing of the first sensor module 18.

As illustrated in FIG. 8, the second sensor module 19 includes a controller 95, a communicator 96, and a power supply 97.

The controller 95 is communicably connected to the signal processor 15 illustrated in FIG. 6 via the communicator 96. The signal processor 15 is realized by a control device such as an ECU mounted on the vehicle 100. The controller 95 is configured to receive a control signal from the signal processor 15 via the communicator 96, and to control the operations of the visible light camera 91, the LiDAR sensor 92, and the millimeter wave radar 93 based on the control signal.

The power supply 97 is configured to receive power from a power source (not illustrated) mounted on the vehicle 100, and to supply the power to the visible light camera 91, the LiDAR sensor 92, the millimeter wave radar 93, and the controller 95.

As illustrated in FIG. 6 and FIG. 8, the second sensor module 19 includes a supporting member 98. The supporting member 98 supports the visible light camera 91, the LiDAR sensor 92, the millimeter wave radar 93, the shielding member 94, the controller 95, the communicator 96, and the power supply 97. The supporting member 98 also serves as a mounting board for sensor circuits including the visible light camera 91, the LiDAR sensor 92, the millimeter wave radar 93, the controller 95, the communicator 96, and the power supply 97.

That is, plural types of sensors differing in sensing manners (the visible light camera 91, the LiDAR sensor 92, and the millimeter wave radar 93), a shielding member 94 surrounding the sensing sections of the plural types of sensors, and circuits for operating the plural types of sensors are modularized on the supporting member 98. Thus, it is possible to provide a configuration that can facilitate mounting work to the right front lamp 4RF while more diverse external information of the vehicle 100 can be obtained.

In addition, since the controller 95, the communicator 96, and the power supply 97 are shared by the visible light camera 91, the LiDAR sensor 92, and the millimeter wave radar 93, it is possible to suppress the enlargement and the cost-increasing of the second sensor module 19.

In the present embodiment, the controller 84 of the first sensor module 18 is configured to process signals outputted from the visible light camera 81 and the LiDAR sensor 82.

The visible light camera 81 is configured to output a video signal corresponding to the captured image. The information of at least on the right of the vehicle 100 sensed by the visible light camera 81 is obtained by appropriately processing the video signal by the controller 84.

The LiDAR sensor 82 outputs a signal corresponding to an attribute (intensity, wavelength or the like) of the sensed returned light. The information of at least on the right of the vehicle 100 sensed by the LiDAR sensor 82 is obtained by appropriately processing the signal outputted by the controller 84.

The information obtained by the controller 84 is transmitted to the signal processor 15 via the communicator 85 as required. Examples of such information include the position and type of an object (a vehicle, a human, an animal, a building, or the like) that is present at least on the right of the vehicle 100.

According to such a configuration, the processing of the information sensed by the visible light camera 81 and the LiDAR sensor 82 can be at least partially assigned to the controller 84 of the first sensor module 18. As a result, the control load of the signal processor 15 mounted on the vehicle 100 can be reduced.

In the present embodiment, the controller 95 of the second sensor module 19 is configured to process signals outputted from the visible light camera 91, the LiDAR sensor 92, and the millimeter wave radar 93.

The visible light camera 91 is configured to output a video signal corresponding to the captured image. Information of at least ahead of the vehicle 100 sensed by the visible light camera 91 is obtained by appropriately processing the video signal by the controller 95.

The LiDAR sensor 92 outputs a signal corresponding to an attribute (intensity, wavelength or the like) of the sensed returned light. The information of at least ahead of the vehicle 100 sensed by the LiDAR sensor 92 is obtained by appropriately processing the signal outputted by the controller 95.

The millimeter wave radar 93 outputs a signal corresponding to an attribute (intensity or the like) of the received reflected wave. The information of at least ahead of the vehicle 100 sensed by the millimeter wave radar 93 is obtained by appropriately processing the signal outputted by the controller 95.

The information obtained by the controller 95 may be transmitted to the signal processor 15 via the communicator 96 as required. Examples of such information include the position and type of an object (a vehicle, a human, an animal, a building, or the like) that is present at least ahead of the vehicle 100.

According to such a configuration, the processing of the information sensed by the visible light camera 91, the LiDAR sensor 92, and the millimeter wave radar 93 can be at least partially assigned to the controller 95 of the second sensor module 19. As a result, the control load of the signal processor 15 mounted on the vehicle 100 can be reduced.

As illustrated in FIG. 6, the first sensor module 18 includes an actuator 88 (one example of the adjusting mechanism). The actuator 88 is a device for adjusting at least one of the position and the posture of the supporting member 87 relative to the vehicle 100. At least a portion of the actuator 88 is disposed in the lamp chamber 13 and is coupled to the supporting member 87.

The actuator 88 is configured to change at least one of the position and the posture of the supporting member 87 with respect to the vehicle 100 in a horizontal plane (in a plane including the front-rear direction and the left-right direction in FIG. 6) and in a vertical plane (in a plane including the left-right direction and the up-down direction in FIG. 6). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The signal processor 15 is configured to output a drive signal A1 for driving the actuator 88. The drive signal A1 includes information for adjusting at least one of the position and the posture of the actuator 88 in the horizontal plane, and information for adjusting at least one of the position and the posture of the actuator 88 in the vertical plane. The respective information may be included in a single signal or may be provided with separate signals.

When the right front lamp 4RF is mounted on the vehicle 100, the sensing reference positions of the sensors may deviate from desired positions due to tolerances of vehicle body components or the positional deviation of the housing 11 relative to the vehicle body. Accordingly, after the right front lamp 4RF is mounted on the vehicle 100, the sensing reference positions of the visible light camera 81 and the LiDAR sensor 82 are readjusted. In the present embodiment, the visible light camera 81 and the LiDAR sensor 82 are supported by the supporting member 87. Therefore, by inputting an appropriate drive signal A1 to the actuator 88, the sensing reference positions of the visible light cameras 81 and the LiDAR sensors 82 can be adjusted collectively.

Therefore, even if the number of types of sensors to be mounted on the right front lamp 4RF increases, it is possible to reduce the burden of works for adjusting the sensing reference positions of the sensors relative to the vehicle 100.

As illustrated in FIG. 6, the second sensor module 19 includes an actuator 99 (one example of the adjusting mechanism). The actuator 99 is a device for adjusting at least one of the position and the posture of the supporting member 98 relative to the vehicle 100. At least a portion of the actuator 99 is disposed in the lamp chamber 13 and is coupled to the supporting member 98.

The actuator 99 is configured to change at least one of the position and the posture of the supporting member 98 with respect to the vehicle 100 in a horizontal plane (in a plane including the front-rear direction and the left-right direction in FIG. 6) and in a vertical plane (in a plane including the left-right direction and the up-down direction in FIG. 6). It should be noted that the "horizontal plane" used herein need not coincide with a strict horizontal plane. Likewise, the "vertical plane" used herein need not coincide with a strict vertical plane. Since the structure of such an actuator itself is well known, detailed descriptions thereof will be omitted.

The signal processor 15 is configured to output a drive signal A2 for driving the actuator 99. The drive signal A2 includes information for adjusting at least one of the position and the posture of the actuator 99 in the horizontal plane, and information for adjusting at least one of the position and the posture of the actuator 99 in the vertical plane. The respective information may be included in a single signal or may be provided with separate signals.

When the right front lamp 4RF is mounted on the vehicle 100, the sensing reference positions of the sensors may deviate from desired positions due to tolerances of vehicle body components or the positional deviation of the housing 11 relative to the vehicle body. Therefore, after the right front ramp 4RF is mounted on the vehicle 100, the sensing reference positions of the visible light camera 91, the LiDAR sensor 92, and the millimeter wave radar 93 are readjusted. In the present embodiment, the visible light camera 91, the LiDAR sensor 92, and the millimeter wave radar 93 are supported by the supporting member 98. Therefore, by inputting an appropriate drive signal A2 to the actuator 99, the sensing reference positions of the visible light camera 91, the LiDAR sensor 92, and the millimeter wave radar 93 can be collectively adjusted.

Therefore, even if the number of types of sensors to be mounted on the right front lamp 4RF increases, it is possible to reduce the burden of works for adjusting the sensing reference positions of the sensors relative to the vehicle 100.

In the present embodiment, the shielding member 83 surrounds the light receiver of the LiDAR sensor 82. As long as the shielding member 83 does not obstruct the non-visible light emitted from the light emitter of the LiDAR sensor 82, the shielding member 83 may be disposed so as to further surround the light emitter of the LiDAR sensor, as indicated by the dashed lines in FIG. 7.

In the present embodiment, the shielding member 94 surrounds the light receiver of the LiDAR sensor 92. As long as the shielding member 94 does not obstruct the non-visible light emitted from the light emitter of the LiDAR sensor 92, the shielding member 94 may be disposed so as to further surround the light emitter of the LiDAR sensor 92, as indicated by the dashed lines in FIG. 8.

In the present embodiment, the shielding member 94 surrounds the receiver of the millimeter wave radar 93. As long as the shielding member 94 does not obstruct the millimeter wave emitted from the transmitter of the millimeter wave radar 93, the shielding member 94 may be disposed so as to further surround the transmitter of the millimeter wave radar 93, as indicated by the dashed lines in FIG. 8.

In the present embodiment, the visible light camera 81 and the visible light camera 91 are exemplified as the sensor for obtaining external information of the vehicle 100. However, as long as the external information of the vehicle 100 can be obtained, the visible light camera 81 and the visible light camera 91 may be replaced with appropriate light sensors.

In the present embodiment, the first sensor module 18 for obtaining information of at least on the right of the vehicle 100 includes the visible light camera and the LiDAR sensor, whereas the second sensor module 19 for obtaining information of at least ahead of the vehicle 100 includes the visible light camera, the LiDAR sensor, and the millimeter wave radar. However, there may be adopted a configuration in which the first sensor module 18 includes the visible light camera, the LiDAR sensor, and the millimeter wave radar, whereas the second sensor module 19 includes the visible light camera and the LiDAR sensor.

In the present embodiment, the LiDAR sensor and the millimeter wave radar are exemplified as the sensor for obtaining external information of the vehicle 100 in a different manner from the visible light camera. Additionally or alternatively, at least one of the first sensor module 18 and the second sensor module 19 may include at least one of an ultrasonic sensor and an infrared camera.

In the present embodiment, the controller 84 processes signals outputted from the visible light camera 81 and the LiDAR sensor 82 of the first sensor modules 18. However, the processing of the signals outputted from the visible light camera 81 and the LiDAR sensor 82 may be performed by the signal processor 15.

In the present embodiment, the controller 95 processes signals outputted from the visible light camera 91, the LiDAR sensor 92, and the millimeter wave radar 93 of the second sensor module 19. However, the processing of the signals outputted from the visible light camera 91, the LiDAR sensor 92, and the millimeter wave radar 93 may be performed by the signal processor 15.

In the present embodiment, the posture of the supporting member 87 of the first sensor module 18 with respect to the vehicle 100 is performed by the actuator 88. However, the posture of the supporting member 87 of the first sensor module 18 with respect to the vehicle 100 may be performed by a well-known aiming screw mechanism (one example of the adjusting mechanism).

In the present embodiment, the posture of the supporting member 98 of the second sensor module 19 with respect to the vehicle 100 is performed by the actuator 99. However, the posture of the supporting member 98 of the second sensor module 19 with respect to the vehicle 100 may be performed by a well-known aiming screw mechanism (one example of the adjusting mechanism).

In the present embodiment, the sensor modules to be mounted on the right front ramp 4RF are exemplified. However, the sensor modules described above may also be mounted on any one of a left front lamp, a left rear lamp, and a right rear lamp that are to be respectively disposed in a left front corner portion, a left rear corner portion, and a right rear corner portion of the vehicle 100 illustrated in FIG. 1. Although the detailed configuration is not illustrated, the left front lamp may have a symmetrical configuration with the right front lamp 4RF relative to the left-right direction.

Although the detailed configuration is not illustrated, the left rear lamp and the right rear lamp are provided with a light source such as a tail lamp. For example, the right rear ramp may have a symmetrical configuration with the right front ramp 4RF relative to the front-rear direction. The rear left lamp may have a symmetrical configuration with the rear right lamp relative to the left-right direction.

In the present embodiment, the sensor module is disposed in the lamp chamber of the lamp device. However, the location where the sensor module is mounted is not limited to the lamp chamber of the lamp device as long as the use of the shielding member is required.

The above-described embodiments are merely examples for facilitating understanding of the gist of the presently disclosed subject matter. The configuration according to each of the above embodiments can be appropriately modified or improved without departing from the gist of the presently disclosed subject matter.

The present application is based on Japanese Patent Application No. 2016-180576 filed on Sep. 15, 2016, and Japanese Patent Application No. 2016-180580 filed on Sep. 15, 2016, the entire contents of which are incorporated herein by reference.

The invention claimed is:

1. A sensor system adapted to be mounted on a vehicle, comprising:
    a stationary housing;
    a first sensor configured to sense information of an outside of the vehicle;
    a second sensor configured to sense information of the outside of the vehicle in a different manner from the first sensor;
    a supporting member supporting the first sensor and the second sensor;
    a first adjuster configured to adjust a sensing reference position of the first sensor relative to, and independent from, the supporting member;
    a second adjuster configured to adjust a sensing reference position of the second sensor relative to, and independent from, the supporting member; and
    a third adjuster configured to adjust at least one of a position and a posture of the supporting member relative to the vehicle thereby adjusting the sensing reference position of the first sensor and the sensing reference position of the second sensor relative to a body of the vehicle;
    wherein the first sensor, the second sensor, the supporting member, the first adjuster, the second adjuster, and the third adjuster are provided inside of the stationary housing.

2. The sensor system according to claim 1, further comprising:
    an actuator configured to adjust at least one of the position and the posture of the supporting member in accordance with a predetermined signal;
    wherein the actuator is provided inside of the stationary housing.

3. A sensor system adapted to be mounted on a vehicle, comprising:
    a first sensor configured to sense information of an outside of the vehicle;
    a second sensor configured to sense information of the outside of the vehicle in a different manner from the first sensor;
    a supporting member supporting the first sensor and the second sensor;
    a first adjuster configured to adjust a sensing reference position of the first sensor relative to the supporting member;
    a second adjuster configured to adjust a sensing reference position of the second sensor relative to the supporting member;
    a third adjuster configured to adjust at least one of a position and a posture of the supporting member relative to the vehicle; and
    an identifier holding information adapted to be identified by the vehicle,
    wherein the third adjuster includes a screw mechanism configured to adjust at least one of the position and the posture of the supporting member; and
    wherein the identifier is configured to be destroyed when the screw mechanism is operated.

4. The sensor system according to claim 3, further comprising:
    a cover covering at least a portion of the screw mechanism,
    wherein the identifier is provided on the cover; and wherein the identifier is configured to be destroyed when the cover is removed.

5. (The sensor system according to claim 1,
wherein the third adjuster includes a screw mechanism disposed in such a position that is not visually recognizable or not operable from a front side or an upper side of the vehicle.

6. The sensor system according to claim 1, further comprising:
a light source configured to emit light for lighting a predetermined area,
wherein the light source is supported on the supporting member,
wherein the light source is provided inside of the stationary housing.

7. The sensor system according to claim 6, further comprising:
a fourth adjuster configured to adjust a lighting reference position of the light source relative to the supporting member.

8. The sensor system according to claim 1,
wherein the first sensor and the second sensor include at least two of a LiDAR sensor, a camera, a millimeter wave radar, and an ultrasonic sensor.

9. The sensor system according to claim 1, further comprising:
an identifier holding information adapted to be identified by the vehicle,
wherein the third adjuster includes a screw mechanism configured to adjust at least one of the position and the posture of the supporting member; and
wherein the identifier is configured to be destroyed when the screw mechanism is operated.

10. The sensor system according to claim 9, further comprising:
a cover covering at least a portion of the screw mechanism.

* * * * *